United States Patent [19]

Nagatake et al.

[11] Patent Number: 5,452,305
[45] Date of Patent: Sep. 19, 1995

[54] FRAME PHASE SYNCHRONIZATION APPARATUS AND METHOD, AND A PHASE SYNCHRONIZATION APPARATUS OF TDM FRAMES

[75] Inventors: Eiji Nagatake; Kazuo Kubo, both of Kanagawa, Japan

[73] Assignee: Mitsubishi Denki Kabushiki Kaisha, Tokyo, Japan

[21] Appl. No.: 161,655

[22] Filed: Dec. 2, 1993

[30] Foreign Application Priority Data

Jan. 11, 1993 [JP] Japan .................. 5-002461
May 31, 1993 [JP] Japan .................. 5-128942

[51] Int. Cl.⁶ .................................. H04J 3/12
[52] U.S. Cl. .................... 370/105.3; 370/100.1; 370/105.1; 370/112
[58] Field of Search ............. 370/105.1, 105.3, 100.1, 370/112, 58.2, 60, 60.1

[56] References Cited

U.S. PATENT DOCUMENTS

| | | | |
|---|---|---|---|
| 4,002,845 | 1/1977 | Kaul et al. | 370/105.1 |
| 4,549,291 | 10/1985 | Renoulin et al. | 370/85.2 |
| 4,667,324 | 5/1987 | Graves | 370/102 |
| 5,111,485 | 5/1992 | Serack | 370/105.3 |
| 5,113,395 | 5/1992 | Murakami et al. | 370/105.1 |
| 5,291,482 | 3/1994 | McHarg et al. | 370/60 |
| 5,325,354 | 6/1994 | Hadano | 370/112 |
| 5,327,434 | 7/1994 | Kubo | 370/105.1 |

FOREIGN PATENT DOCUMENTS 0102810 3/1984 European Pat. Off. .
WO90/06660 6/1990 WIPO .

OTHER PUBLICATIONS

R. W. Hamlin & B. Parruck "A Sonet/SDH Overhead Terminator for STS-3, STS3C and STM-1" IEEE 1992 Custom Integrated Circuits Conference.

Primary Examiner—Douglas W. Olms
Assistant Examiner—Shick Hom
Attorney, Agent, or Firm—Wolf, Greenfield & Sacks

[57] ABSTRACT

A first frame counter generates a position signal for an input subframe address which is synchronized with an input clock signal based on an input frame phase signal. The first frame counter also generates a write address enabling signal. A subframe type detector generates a write/read control signal based on an input frame signal. Depending upon the position signal for the input subframe address, the write address enabling signal and the write/read control signal, a first subframe phase synchronization device and a second to nth subframe phase synchronization device control a buffer corresponding to 1/m of a frame data amount by a write address, where m (n>=m) is a multiplexing number. The first subframe phase synchronization device and the second to mth subframe phase synchronization device writes data corresponding to a first to mth input subframe signal based on the input frame signal into a buffer respectively. An input relative phase is synchronized with a standard relative phase. The synchronized signal is output as a synchronized frame signal.

32 Claims, 28 Drawing Sheets

FIG.16

| MULTPX.# | NO.OF SUBF.PH.SYN.MNS.USED | BF.MEM.SIZE |
|---|---|---|
| m = 1 | 3 | M / 3 |
| m = 3 | 3 | M / 3 |

FIG.17

| MULTPX.# | NO.OF SUBF.PH.SYN.MNS.USED | BF.MEM.SIZE |
|---|---|---|
| m = 1 | 3 | M / 2 |
| m = 2 | 2 | M / 2 |
| m = 3 | 3 | M / 2 |

FIG.18

| MULTPX.# | NO.OF SUBF.PH.SYN.MNS.USED | BF.MEM.SIZE |
|---|---|---|
| m = 1 | 4 | M / 2 |
| m = 2 | 2 | M / 2 |
| m = 3 | 3 | M / 2 |
| m = 4 | 4 | M / 2 |

FIG.26  RELATED ART m=1

FRAME PHASE SYNCHRONIZATION APPARATUS AND METHOD, AND A PHASE SYNCHRONIZATION APPARATUS OF TDM FRAMES

BACKGROUND OF THE INVENTION

1. Field of the Invention

The present invention relates to a phase synchronization apparatus of Time Division Multiplexed frames (TDM frames) which synchronizes an input relative phase of TDM subframe signals with a standard relative phase.

2. Description of the Related Art

FIG. 19 shows a conventional phase synchronization apparatus of TDM frames stated in the Japanese Patent Application No. 3-60083.

In FIG. 19, a first frame counter 1b generates a position signal 14 for an input subframe address which is synchronized with an input clock signal 12 based on an input frame phase signal 13. For example, signal 13 is a pulse signal for indicating a head position of an input frame. The input subframe address is stored in the overhead of an input frame signal area (refer to FIG. 22). The input subframe address indicates each relative phase of input subframes with an input frame phase. The position signal 14 for the input subframe address is a pulse signal which indicates each position of the input subframe address.

A second frame counter 5 generates a position signal 20 for a standard subframe address which is synchronized with a standard clock signal 18 based on a standard frame phase signal 19. For example, signal 19 is a pulse signal for indicating a head position of a standard frame. The standard subframe address is stored in the overhead of a standard frame signal area (refer to FIG. 22). The standard subframe address indicates each relative phase of standard subframes with a standard frame phase. The position signal 20 for the standard subframe address is a pulse signal which indicates each position of the standard subframe address.

The first frame counter 1b generates a position signal 23a for an input subframe. The position signal 23a is a pulse signal which indicates each position of the input subframes multiplexed in the input frame. The second frame counter 5 generates a position signal 23 for a standard subframe. The position signal 23 is a pulse signal which indicates each position of the standard subframes multiplexed in the standard frame.

Depending upon the position signal 23a for the input subframe from the first frame counter 1b, a demultiplexer (DMUX) 1c demultiplexes a first to mth input subframe signal 17a (refer to FIG. 22) in a subframe signal area based on the input frame signal 11.

The input subframe address of the first to mth input subframe signal 17a is in the overhead of the input frame signal area. Depending upon the first to mth input subframe signal 17a from the DMUX 1c, a subframe type detector 2a identifies a type of subframe by a specific pattern of the input subframe address. For instance, assuming that the number of the input subframes multiplexed in the input frame is "m", then the type of the subframe is identified by "m" (m is a positive integer). The number of the subframes, that is m, is hereinafter called a "multiplexing number". The subframe type detector 2a generates a write/read control signal 16 based on the multiplexing number $m=1$ or $m>=2$.

A first to nth ($n>=m$) subframe phase synchronization means 3d, 3e, . . . , 3e are provided for synchronizing the input frame signal with the standard clock signal 18.

Depending upon the position signal 14 for the input subframe address from the first frame counter 1b, the first subframe phase synchronization means 3d controls writing data into a buffer. A data amount in the case of there being only one subframe signal in the input frame signal is hereinafter called "M". The first subframe phase synchronization means 3d generates a write address 21 to control writing data into the buffer. The write address 21 controls writing data corresponding to $1/n$ of the data amount M. The first subframe phase synchronization means 3d writes data corresponding to $1/n$ signal of the input subframe signal into the buffer when the multiplexing number from the DMUX 1c is one ($m=1$). The synchronization means 3d writes data corresponding to the first input subframe signal 17a into the buffer when the multiplexing number is two or more than two ($m>=2$).

The first subframe phase synchronization means 3d controls reading data from the buffer depending upon the position signal 20 for the standard subframe address from the second frame counter 5. The synchronization means 3d generates a read address 22 which controls reading data from the buffer to correspond with $1/n$ of the data amount M when $m=1$ or $1/m$ of the data amount M when $m>=2$. The synchronization means 3d reads data corresponding to $1/n$ signal of the input subframe signal from the buffer when the multiplexing number from the DMUX 1c is one ($m=1$). The synchronization means 3d reads data corresponding to the first input subframe signal 17a from the buffer when the multiplexing number is two or more than two ($m>=2$). Thus the input relative phase is synchronized with the standard relative phase and the synchronized signal is output as a first synchronized subframe signal 17.

Each second to nth subframe phase synchronization means 3e controls writing data into the buffer depending upon the position signal 14 for the input subframe address from the first frame counter 1b and the write/read control signal 16 from the subframe type detector 2a. Each second to nth subframe phase synchronization means 3e writes data corresponding to $1/n$ signal of the input subframe signal into the buffer when the multiplexing number from the DMUX 1c is one ($m=1$). Each second to mth subframe phase synchronization means 3e writes data corresponding to the second to mth input subframe signal 17a into the buffer respectively when the multiplexing number is two or more than two ($m>=2$).

Each second to nth subframe phase synchronization means 3e controls reading data from the buffer depending upon the position signal 20 for the standard subframe address from the second frame counter 5 and the write/read control signal 16 from the subframe type detector 2a. Each second to nth subframe phase synchronization means 3e reads data corresponding to $1/n$ signal of the input subframe signal from the buffer when the multiplexing number from the DMUX 1c is one ($m=1$). Each second to mth subframe phase synchronization means e reads data corresponding to the second to mth input subframe signal 17a respectively when the multiplexing number is two or more than two ($m>=2$). Thus the input relative phase is synchronized with the standard relative phase and the synchronized signal is output as the second to mth synchronized subframe signal 17.

Each second to nth subframe phase synchronization means 3e selects the read address 22 from the first subframe phase synchronization means 3d when m=1 to control reading data from the buffer. Each second to mth subframe phase synchronization means 3e generates a read address 22a corresponding to 1/m of the data amount M when m>=2 to control reading data from the buffer.

Depending upon the position signal 23 for the standard subframe from the second frame counter 5, a multiplexer (MUX) 4 multiplexes the first to mth synchronized subframe signal 17 from the first subframe phase synchronization means 3d and each second to nth subframe phase synchronization means 3e. The MUX 4 outputs the multiplexed signal as a synchronized frame signal 24.

A system of synchronizing the input relative phase with the standard relative phase by demultiplexing the input frame signal 11 into subframe signals is implemented in the conventional phase synchronization apparatus of TDM frames. The system is called "Phase Synchronization System With Demultiplexing Frames".

FIG. 20 shows a configuration of the first subframe synchronization means 3d.

First, depending upon the position signal 14 for the input subframe address from the first frame counter 1b, a subframe phase detector 31a detects an input subframe phase of the first input subframe signal 17a from the DMUX 1c. The detector 31a generates an input subframe phase signal (for instance, the signal is a pulse signal for indicating the head position of the input subframe).

Secondly a write controller 32 generates a write address counter enabling signal depending upon the input subframe phase signal from the subframe phase detector 31a. Depending upon the write address counter enabling signal, a write address counter 33 generates the write address 21 which controls writing into the buffer to correspond with 1/n of the data amount M when m=1 or 1/m of the data amount M when m>=2. Depending upon the write address 21, a buffer memory 37a writes data corresponding to the first input subframe signal 17a from the DMUX 1c.

Thirdly a read controller 35 generates a read address counter enabling signal depending upon the position signal 20 for the standard subframe address from the second frame counter 5. Depending upon the read address counter enabling signal, a read address counter 36 generates the read address 22 which controls reading data from the buffer to correspond with 1/n of the data amount M when m=1 or 1/m of the data amount M when m>=2. Depending upon the read address 22, the buffer memory 37a reads the data out as the first synchronized subframe signal 17 to the MUX 4.

At this point, an address phase comparator 34 calculates a phase difference between a phase of the write address 21 from the write address counter 33 and a phase of the read address 22 from the read address counter 36. Then when the phase difference exceeds a specific value, an error signal of phase synchronization is generated.

Depending upon the error signal, the read controller 35 turns the read address counter enabling signal "on" or "off" to shift the read address 22. Thus, the read controller 35 synchronizes the input relative phase with the standard relative phase.

FIG. 21 shows a configuration of each second to nth subframe phase synchronization means 3e. In addition to the configuration of the first subframe phase synchronization means 3d, a write selector 39 and a read selector 38 are provided in each second to nth synchronization means 3e. Depending upon the write/read control signal 16 from the subframe type detector 2a, the write selector 39 selects the write address 21 from the first subframe phase synchronization means 3d when m=1. The selector 39 selects a write address 21a from the write address counter 33 when m>=2. The write address counter 33 generates the write address 21a which controls writing data into the buffer to correspond with 1/m of the data amount M.

Depending upon the write/read control signal 16 from the subframe type detector 2a, the read selector 38 selects the read address 22 from the first subframe phase synchronization means 3d when m=1. The selector 38 selects a read address 22a from the read address counter 36 when m>=2. The read address counter 36 generates the read address 22a which controls reading data from the buffer to correspond with 1/m of the data amount M.

Some concrete examples are presented with FIG. 23 to FIG. 27. A frame configuration of STM-1 (STM: Synchronous Transport Module) is illustrated here. FIGS. 23 and 24 show the frame configuration of STM-1. FIG. 23 shows the frame configuration in the case of the multiplexing number being one (m=1). FIG. 24 shows the frame configuration in the case of the multiplexing number being three (m=3).

The size of a frame of STM-1 is 270 bytes by 9 rows. An overhead and a payload are stored in one frame. In the overhead, a section overhead (SOH: all the part of the overhead except the fourth row) and a pointer (PTR: the fourth row of the overhead) are stored. SOH is used for synchronizing frames and watching errors. The first 6 bytes of SOH are used for synchronizing frames. The pointer is placed at the fourth row in the figure. The pointer contains some values (addresses) each of which means a phase difference between a head position of the input frame signal and each head position of the multiplexed subframe signals.

Various kinds of virtual containers (VC) are placed in the payload. FIG. 23 relates to a synchronous transport module level 1 (64 Kb/S for 2016CH) STM-1 (156 Mb/s) frame configuration. FIG. 23 shows the case of there being only one virtual container in the payload, in other words it shows the case of the multiplexing number being one (m=1). Bytes H11 and H21 are used as a pointer when the multiplexing number is one. An address of the head position of a multiplexed signal of a virtual container in the payload is shown by using the two bytes H11 and H21. Therefore, when the head of the virtual container is data k1, H11 and H21 show an address wherein the data k1 is stored. Bytes H12 and H22 are used as a second pointer when another virtual container in addition to the above one is placed in the payload. Bytes H13 and H23 are used as a third pointer when there is yet another virtual container in the payload. Since FIG. 23 shows the case of the multiplexing number being one, only one virtual container is multiplexed in it. Therefore pointers H12, H13, H22 and H23 show a fixed value.

The case of the multiplexing number being three is now presented with FIG. 24. FIG. 24 relates to STM-1:

synchronous transport module level 1 (64 Kb/S for 2016); VC-32: virtual container 32 (64 K/S for 672 CH); VC-11: virtual container 11 (64 Kb/s for 24 CH) and STM-1 (156 Mb/s) frame configuration. Since the multiplexing number is three, there are three virtual containers in the payload. Assuming that data a1 is a head data of the first virtual container (VC#1) which is multiplexed first, the address of the data a1 of the first virtual container (VC#1) is stored by using the two bytes H11 and H21. Assuming that data a2 is the head data of the second virtual container (VC#2) which is multiplexed secondly, the address of the data a2 of the second virtual container (VC#2) is stored by the two bytes H12 and H22. Assuming that data a3 is the head data of the third virtual container (VC#3) which is multiplexed thirdly, the address of the data a3 of the third virtual container (VC#3) is stored by the two bytes H13 and H23.

A timing chart of some signals shown in FIG. 19 is presented with FIG. 25. When the input frame signal 11 is input, the input frame phase signal 13 is turned on synchronous with the input clock signal 12 at the head byte of the signal 11. At the moment when the address indicating the head position of the multiplexed subframe signal, that is, the pointer (the fourth row in the overhead) of the input frame signal 11 is input, the position signal 14 for the input subframe address is output from the first frame counter 1b. Since the input frame phase signal 13 is input in the first frame counter 1b, at the moment when 270 bytes by 3 rows have passed since the input, that is, at the head byte of the fourth row, the first frame counter 1b turns on the position signal for the input subframe address. In other words, at the time of the byte H11, a position signal 14-1 for the input subframe address shown in FIG. 25 is turned on. At the time of the byte H12, the first frame counter 1b turns on a position signal 14-2 for the input subframe address. At the time of the byte H13, a position signal 14-3 is turned on. Similarly, at the time of bytes H21, H22, H23, position signals 14-1, 14-2, 14-3 for the input subframe address are turned on in turn respectively. The position signals 14-1, 14-2, 14-3 are input into the first, the second and the third subframe phase synchronization means respectively. The subframe phase synchronization means detects the address of the head position of the subframe depending upon the moment of the inputted position signal for the input subframe address. Then, using the address of the head position of the subframe, the synchronization means stores the data that follows the head position into the buffer memory.

Figure 26:
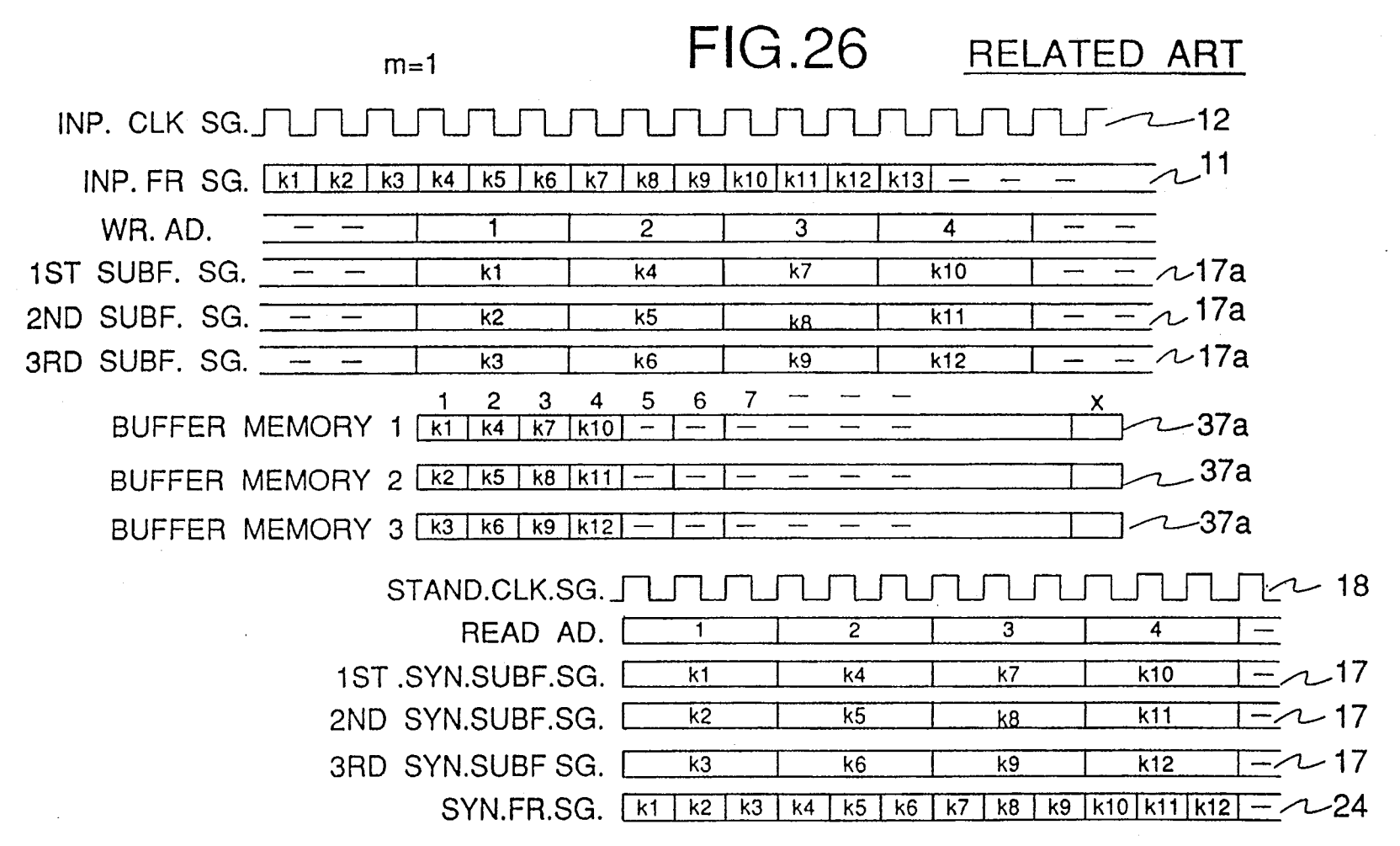

FIG. 26 illustrates an operation of the DMUX 1c and the MUX 4 shown in FIG. 19. FIG. 26 shows the case of the multiplexing number being one. Data k1, k2, k3, ... is supposed to be contained in the input frame signal. The buffer memory is supposed to be empty, that is to have no data in it. The DMUX 1c inputs the input frame signal 11 and outputs the first, the second and the third subframe signal. For instance, each data of k1, k2, k3 is separated into the first, the second, the third subframe signal respectively by the DMUX. While the DMUX 1c outputs signals of data k1, k2, k3 respectively as a subframe signal, "1" is generated as the write address of the buffer memory. Accordingly data k1, k2, k3 are stored in the address "1" of each buffer memory. Similarly, data k4, k5, k6 being input after k1, k2, k3 are separated into the first, the second and the third subframe signal by the DMUX 1c. While each data k4, k5, k6 are output as the subframe signal, "2" is generated as the write address of the buffer memory. Accordingly data k4, k5, k6 are stored in the address "2" of each buffer memory. All these operations are done being synchronized with input clock signal 12.

Depending upon the standard clock signal 18, data stored in the buffer memory is read out by the MUX 4. In the case of "1" being generated as a read address, the buffer memory outputs data k1, k2, k3 in the address "1". While the read address outputs "1", the buffer memory keeps outputting data k1, k2, k3 respectively as the first, the second, the third synchronized subframe signal. Depending upon the standard clock signal, the MUX 4 generates a synchronized frame signal based on the output synchronized subframe signal.

FIG. 27 illustrates an operation of the DMUX and the MUX in the case of the multiplexing number being three. The operations presented in FIG. 26 almost correspond to the operation in the case of the multiplexing number being three. The operation shown in FIG. 27 differs from the operation shown in FIG. 26 in that each data of the input frame signal and the synchronized frame signal is byte interleaved per data stored in the virtual container. In other respects, FIG. 27 corresponds to FIG. 26.

Besides, there is a conventional circuit or apparatus for lining up heads of subframes multiplexed in a multiplexed frame signal. It is called a frame aligner here.

FIG. 28 shows the conventional frame aligner disclosed in the Unexamined Japanese Patent Publication No. 4-2233. The frame aligner can synchronize the phase of the frame of each highway signal multiplexed in an input highway multiplexed signal D11 by time sharing.

This circuit for frame phase synchronization has a circuit 111 for detecting a frame head, which detects a time of an input frame head at each digital line. The circuit also has a first frame counter 113. The frame counter 113 calculates an input frame phase and generates the input frame phase signal at each digital line depending upon the time of the input frame head detected by the circuit 111.

In addition, the circuit has a second frame counter 118. The frame counter 118 calculates a common frame phase for synchronizing a frame phase of each digital line with a common phase, and generates a common frame phase signal.

The circuit for frame phase synchronization has a frame memory 116. The frame memory 116 stores data on frames at each digital line temporarily, using the input frame phase signal generated by the first frame counter as a write address. And the frame memory 116 outputs each digital line with a common phase, using a common frame phase signal generated by the second frame counter as a read address.

The circuit also has a circuit 119 for phase comparing and controlling. The circuit 119 compares the input frame phase signal of the first frame counter and the common frame phase signal of the second frame counter at the each digital line. Then, the circuit 119 revises the phase of the first frame counter when the input frame phase and the common frame phase indicate close correspondence.

As described above, the circuit for frame phase synchronization comprises a logical processing circuit and a memory. The logical processing circuit comprises the circuit 111 for detecting the frame head, the first frame counter 113 and the circuit 119 for phase comparing and controlling respectively in time sharing per each line in order depending upon a multiplexing order of the digital line. The memory stores a result of processing by the logical processing circuit temporarily. The frame phase synchronization circuit synchronizes frame phases in time sharing.

For the purpose of making a configuration of the frame aligner simple and small, the aligner is supposed to be able to synchronize the frame phases of the multiplexed highway signals in the intact multiplexing condition. In other words, each highway signal (each digital line) is synchronized by a time sharing process.

Thus all highway signals read out from the frame memory 116 have a unified phase. The multiplexed highway signal is output as a signal D12. Namely, the signal D12 output from the frame memory 116 has already become a highway multiplexed signal wherein the head positions of all highway signals are aligned. By the configuration stated above, a unified synchronization for frame phase can be accomplished at each highway.

FIG. 29 shows a circuit of a conventional multiplexed frame aligner disclosed in the Unexamined Japanese Patent Publication No. 1-228228.

The circuit of multiplexed frame aligner makes different frame phases of multiplexed channel data suited for a specific standard phase.

The circuit has a detector 201 for a multiplexed synchronization. The detector 201 inputs the multiplexed channel data, detects synchronization of frames by checking the multiplexed channel data, and outputs a frame pulse corresponding to a specific common data position in each channel data.

The circuit has a detector 202 for detecting a multiplexed phase difference. The detector 202 detects a phase difference between the standard phase and each frame pulse for each channel.

The circuit has a delay generator 203 which generates a delay corresponding to the phase difference at each channel.

The circuit has an output controller 204 which delays each channel data corresponding to an amount of delay.

The circuit has a channel address generator 205 which gives each address to each circuit stated above. The address corresponds to each channel.

The circuit of multiplexed frame aligner detects synchronization of frames from multiplexed input data in the detector 201 for the multiplexed synchronization. And the detector 201 outputs a frame pulse, for each channel, corresponding to a specific common data position in the frame, depending upon each channel address from the channel address generator 205. The frame pulse is compared with a standard phase signal at the detector 202 for the multiplexed phase difference. The phase difference between the standard phase and the frame pulse is detected for each channel. The detected phase difference for each channel is sent to the delay generator 203. An amount of delay corresponding to the phase difference is generated in the generator 203. The generated delay amount of each channel is sent to the output controller 204 and delays data of each channel depending on the amount of delay. Therefore the data suited for the standard phase can be always output.

As mentioned above, the conventional frame aligner is shown in FIGS. 28 and 29.

The circuit for frame phase synchronization shown in FIG. 28 aligns a phase of each highway signal with the standard frame phase by inputting the highway multiplexed signal without demultiplexing, writing data into the frame memory in time sharing, reading it using the unified phase. The object of the circuit is to align heads of subframes multiplexed in the multiplexed frame signal. Since the circuit is supposed to align head positions of highway signals in the output highway multiplexed signals, it doesn't have means for controlling reading data from the frame memory. Since the circuit is supposed to align head positions of highway signals, the frame memory needs enough area to store a respective highway signal and information on frames.

The circuit of multiplexed frame aligner shown in FIG. 29 aligns a head of each channel data with the standard frame phase by detecting the phase difference between the phase of channel data multiplexed in the multiplexed frame signal and a standard phase, putting a delay corresponding to the phase difference at each channel.

The multiplexed frame aligner described above aligns heads of subframes multiplexed in the multiplexed frame signal.

As stated above, the frame aligner is supposed to align heads of subframes multiplexed in the multiplexed frame signal.

The object of the present invention is to improve a frame phase synchronization apparatus which inputs the input frame signal being synchronized with the input clock signal and outputs the synchronized frame signal synchronous with the standard clock signal, so as to synchronize data, which is synchronized with the input clock signal, with the standard clock signal.

SUMMARY OF THE INVENTION

Since a system of synchronizing an input relative phase with a standard relative phase by demultiplexing an input frame signal into subframe signals is implemented in the conventional phase synchronization apparatus of TDM frames, it has been a problem that the demultiplexer has made the size of a hardware large.

It is an object of a frame phase synchronization apparatus, a frame phase synchronization method and a phase synchronization apparatus of TDM frames of the present invention to provide a system of synchronizing the input relative phase with the standard relative phase without demultiplexing the input frame signal into subframe signals so as to make the hardware size small. This system is called, "Phase Synchronization System Without Demultiplexing Frames". Especially when a configuration without a MUX is implemented, the system has a much more effect of making the hardware size small.

The frame phase synchronization apparatus according to one aspect of the present invention comprises the following:

(a) a frame counter for outputting a write permission signal corresponding to each data of the multiplexed subframes;

(b) a plurality of subframe phase synchronization means, each of which corresponding to each of the subframes and having a buffer memory, for inputting an input frame signal, demultiplexing data of subframes from the input frame signal, storing the demultiplexed data into the buffer memory depending upon the write permission signal from the frame counter, and outputting data stored in the buffer memory being synchronized with the standard clock signal; and (c) multiplexing means for multiplexing data output from the subframe phase synchronization means and producing a synchronized frame signal.

The phase synchronization apparatus of TDM frames according to another aspect of the present invention comprises the following:

A first frame counter generates a position signal for an input subframe address which is synchronized with an input clock signal based on the input frame phase signal. The input subframe address is stored in the overhead of an input frame signal area. The input subframe address indicates each relative phase of input subframes with an input frame phase.

The first frame counter also generates a write address enabling signal which enables writing data into the buffer memory of a first and a second to nth subframe phase synchronization means.

A second frame counter generates a position signal for a standard subframe address which is synchronized with a standard clock signal based on a standard frame phase signal. The standard subframe address is stored in the overhead of a standard frame signal area. The standard subframe address indicates each relative phase of standard subframes with a standard frame phase. The second frame counter also generates a position signal for a standard subframe into the buffer memory of the first and the second to nth subframe phase synchronization means. The position signal for the standard subframe indicates each position of standard subframes multiplexed in a standard frame.

A subframe type detector identifies a type of subframe in the input frame signal by a specific pattern of the input subframe address. The type of subframe indicates a multiplexing number (m) of the input subframes multiplexed in the input frame (m is a positive integer). The detector generates a write/read control signal corresponding to m=1 or m>=2.

Depending upon the position signal for the input subframe address from the first frame counter, the position signal for the standard subframe address from the second frame counter and the write address enabling signal from the first frame counter, the first subframe phase synchronization means according to this aspect of the invention operates as follows.

The synchronization means generates the write address and the read address corresponding to 1/n of the data amount M when m=1 or 1/m of the data amount M when m>=2 to control writing and reading for the buffer. The synchronization means selects 1/n signal of the input subframe signal from the input frame signal when m=1. The synchronization means selects the first input subframe signal from the input frame signal when m>=2. The synchronization means writes the data corresponding to the selected signal into the buffer and synchronizes the input relative phase with the standard relative phase. Then the synchronization means outputs the synchronized signal as a first synchronized subframe signal.

According to this aspect of the invention, the first to nth (n>=m) subframe phase synchronization means are provided for synchronization.

Depending upon the position signal for the input subframe address from the first frame counter, the position signal for the standard subframe address from the second frame counter, the write address enabling signal from the first frame counter and the write/read control signal from the subframe type detector, the second to nth subframe phase synchronization means according to this aspect of the invention operates as follows.

The second to nth subframe phase synchronization means selects the write address and the read address from the first subframe phase synchronization means and controls the buffer when m=1. The synchronization means generates the write address and the read address corresponding to 1/m of the data amount M and controls the buffer when m>=2. The synchronization means selects 1/n signal of the input subframe signal from the input frame signal when m=1. The synchronization means selects the second to mth input subframe signal from the input frame signal when m>=2. The synchronization means writes the data corresponding to the selected signal into the buffer and synchronizes the input relative phase with the standard relative phase. The synchronization means outputs the synchronized signal as a second to mth synchronized subframe signal.

Depending upon the position signal for the standard subframe from the second frame counter, a MUX multiplexes the first to mth synchronized subframe signal from the first subframe phase synchronization means and the second to mth subframe phase synchronization means. The MUX outputs the multiplexed signal as the synchronized frame signal.

The frame phase synchronization apparatus according to yet another aspect of the present invention comprises the following:
 (a) the plurality of subframe phase synchronization means, each of which corresponding to each of the subframes, for generating a write address corresponding to each data of each subframe;
 (b) address selecting means for selecting an address out of the write addresses generated by the subframe phase synchronization means;
 (c) the buffer memory for inputting the input frame signal, and storing data of the multiplexed subframes depending upon the address selected by the address selecting means;
 (d) multiplexing means for reading and multiplexing data out of the buffer memory, and producing the synchronized frame signal.

The frame phase synchronization apparatus according to another aspect of the present invention comprises the following:
 (a) demultiplexing means for inputting the input frame signal and demultiplexing the multiplexed subframes;
 (b) the plurality of subframe phase synchronization means, each of which corresponding to each of the subframes, for generating the read address corresponding to each data of each subframe;
 (c) address selecting means for selecting the address out of the write addresses generated by the subframe phase synchronization means; and
 (d) the buffer memory for storing data demultiplexed by the demultiplexing means, and reading the data out depending upon the address selected by the address selecting means.

The phase synchronization apparatus of TDM frames according to another aspect of the present invention comprises the following:

The first frame counter generates the position signal for the input subframe address which is synchronized with the input clock signal based on the input frame phase signal. The input subframe address is stored in the overhead of the input frame signal area. The input subframe address indicates each relative phase of input subframes with the input frame phase.

The first frame counter also generates a write address selection signal which is synchronized with the input subframe phase.

The second frame counter generates the position signal for the standard subframe address which is synchronized with the standard clock signal based on the standard frame phase signal.

The second frame counter generates a read address selection signal which is synchronized with the standard subframe phase.

Depending upon the position signal for the input subframe address from the first frame counter, the position signal for the standard subframe address from the second frame counter and the write/read control signal from the subframe type detector, the first subframe phase synchronization means according to this aspect of the invention operates as follows.

The first subframe phase synchronization means controls generating the write address and the read address to correspond with the data amount M from the input frame signal when m=1, or to correspond with 1/m of M from the input frame signal when m> =2. The synchronization means controls generating the read address for the data corresponding to the data amount M when m=1, or corresponding to the first input subframe signal when m> =2, to synchronize the input relative phase with the standard relative phase. The generated write address and read address are output.

Depending upon the position signal for the input subframe address from the first frame counter and the position signal for the standard subframe address from the second frame counter, the second to nth subframe phase synchronization means according to this aspect of the invention operates as follows.

Depending upon the input frame signal, the second to nth subframe phase synchronization means controls generating the write address and the read address to correspond with 1/n of the data amount M. The synchronization means controls generating the read address for the data corresponding to the second to mth input subframe signal when m> =2, to synchronize the input relative phase with the standard relative phase. The generated write address and read address are output.

Depending upon the write address from a second selector, the buffer memory writes the first to mth input subframe signal, effectively demultiplexing based on the input frame signal. Depending upon the read address from a fourth selector, the buffer memory reads out the first to mth synchronized subframe signal, effectively multiplexing and outputting it as the synchronized frame signal. However, no demultiplexer or multiplexer are used.

Depending upon the write/read control signal from the subframe type detector, a first selector selects the write address selection signal from the first frame counter. Depending upon the write/read control signal from the subframe type detector, a third selector selects the read address selection signal from the second frame counter.

Depending upon the write address selection signal from the first selector, the second selector selects the write address from the first and the second to mth subframe phase synchronization means in order. Depending upon the read address selection signal from the third selector, the fourth selector selects the read address from the first and the second to mth subframe phase synchronization means in order.

The frame phase synchronization method according to yet another aspect of the present invention comprises the following steps:

(a) inputting the input frame signal into each of a plurality of subframe phase synchronization means;

(b) generating a write permission signal corresponding to data of each multiplexed subframe and giving the write permission signal to each subframe phase synchronization means;

(c) generating an address for writing data of the input frame signal into a buffer memory in each subframe synchronization means, synchronous with the input frame signal input by the inputting step;

(d) writing data of the input frame signal into the buffer memory at each subframe phase synchronization means, synchronous with the write permission signal depending upon the address generated by the address generating step; and (e) reading and multiplexing data from the buffer memory, and outputting the synchronized frame signal.

The frame phase synchronization method according to yet another aspect of the invention comprises steps of:

(a) generating write addresses of the buffer memory corresponding to each data of the subframe;

(b) selecting a write address out of the write addresses generated from the write address generating step in turn;

(c) inputting the input frame signal and writing data of each subframe into the buffer memory depending upon the address selected by the write address selecting step; and (d) reading out and multiplexing the data written in the buffer memory by the writing step, synchronous with the standard clock signal.

The frame phase synchronization method according to yet another aspect of the invention comprises steps of:

(a) generating read addresses of the buffer memory to correspond with each data of each subframe of the synchronized frame signal;

(b) selecting a read address out of the read addresses generated by the read address generating step in turn; and (c) reading out data of each subframe from the buffer memory by the read address selected by the read address selecting step.

BRIEF EXPLANATION OF THE DRAWINGS

FIG. 16 shows a relation among a multiplexing number and a number of subframe phase synchronization means and a buffer memory size.

FIG. 17 shows a relation among a multiplexing number and a number of subframe phase synchronization means and a buffer memory size.

FIG. 18 shows a relation among a multiplexing number and a number of subframe phase synchronization means and a buffer memory size.

FIG. 26 is a timing chart of the conventional apparatus of FIG. 19 in the case of a multiplexing number being one.

DESCRIPTION OF THE PREFERRED EMBODIMENTS

Embodiment 1

Figure 1:
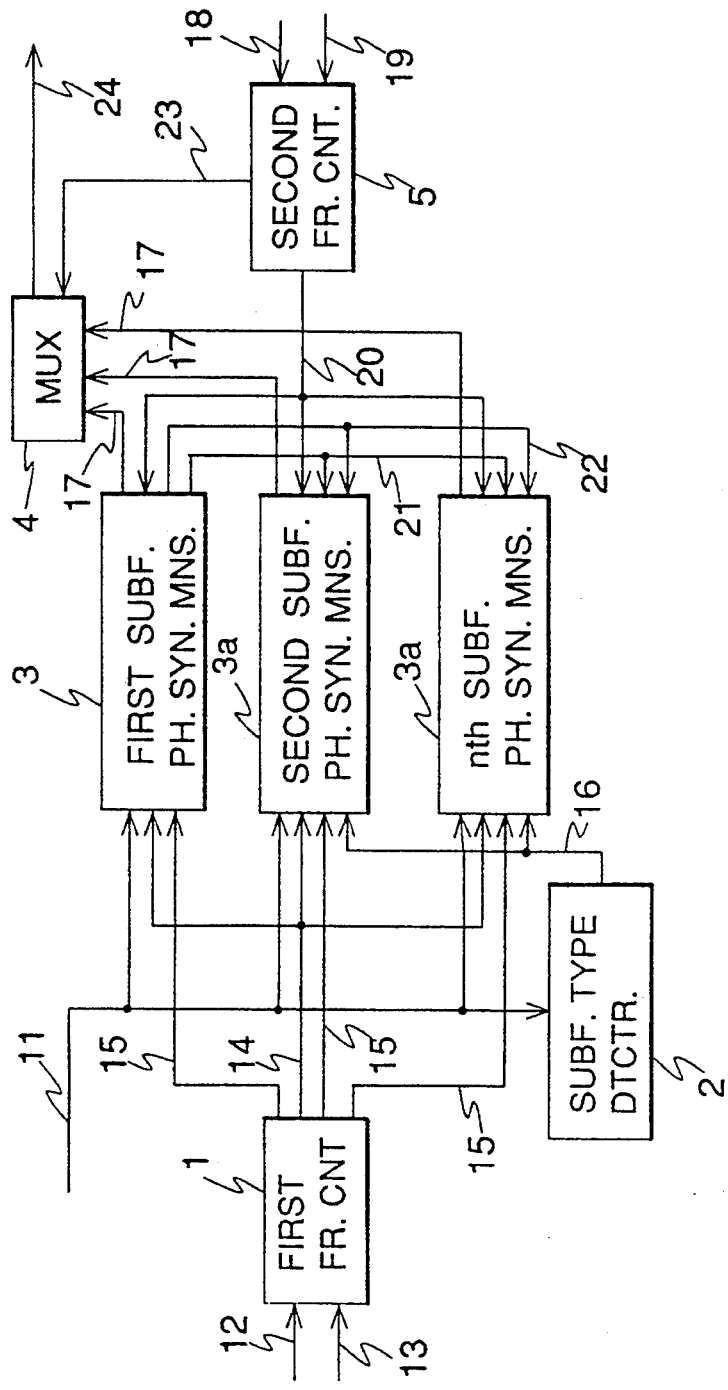
FIG. 1 is a schematic block diagram showing one of embodiments of a phase synchronization apparatus of TDM frames of the present invention.

FIG. 1 shows one of embodiments of the phase synchronization apparatus of TDM frames of the present invention. The system using a multiplexer (MUX) is described in this embodiment. A first frame counter 1 generates a position signal 14 for an input subframe address which is synchronized with an input clock signal 12 based on an input frame phase signal 13 (ex. The signal 13 is a pulse signal for indicating a head position of an input frame). The input subframe address is stored in an overhead of an input frame signal area. The input subframe address indicates each relative phase of input subframes with an input frame phase. The position signal 14 for the input subframe address is a pulse signal which indicates each position of the input subframe address. The first frame counter 1 also generates a write address enabling signal 15 which enables writing data into a buffer memory (FIG. 2, 37) of a first subframe phase synchronization means 3 and that of a second to nth subframe phase synchronization means 3a.

A subframe type detector 2 identifies a type of subframe in an input frame signal 11 by a specific pattern of the input subframe address. For instance, the detector 2 identifies a multiplexing number (m) of input subframes multiplexed in an input frame (m is a positive integer). The detector 2 generates a write/read control signal 16 corresponding to the multiplexing number $m=1$ or $m>=2$.

The first subframe phase synchronization means 3 inputs the position signal 14 for the input subframe address from the first frame counter 1 and the write address enabling signal 15 from the first frame counter 1. Depending upon these input signals, the synchronization means 3 generates a write address 21 to control writing into a buffer. The write address 21 controls writing data into the buffer to correspond with 1/n of the data amount M when $m=1$ or 1/m of the data amount M when $m>=2$. The data amount in the case of there being only one subframe in the input frame signal is hereinafter called M. The synchronization means 3 writes data based on an input frame signal 11 into the buffer. The synchronization means 3 writes the data corresponding to 1/n signal of an input subframe signal when $m=1$, or corresponding to a first input subframe signal when $m>=2$.

In addition, depending upon a position signal 20 for a standard subframe address from a second frame counter 5, the first subframe phase synchronization means 3 generates a read address 22 to control reading from the buffer. The read address 22 controls reading to correspond with 1/n of the data amount M when $m=1$ or 1/m of the data amount M when $m>=2$. The synchronization means 3 reads data stored in the buffer based on the input frame signal 11. The synchronization means 3 reads the data corresponding to 1/n signal of the input subframe signal from the buffer when $m=1$, or corresponding to the first input subframe signal from the buffer when $m>=2$. Thus the input relative phase is synchronized with a standard relative phase and the synchronized signal is output as a first synchronized subframe signal 17.

Each second to nth subframe phase synchronization means 3a inputs the position signal 14 for the input subframe address and the write address enabling signal 15 from the first frame counter 1 and the write/read control signal 16 from the subframe type detector 2. Depending upon these input signals, each second to nth subframe phase synchronization means 3a selects the write address 21 from the first subframe phase synchronization means 3 to control writing data into the buffer when $m=1$. Each second to mth subframe phase synchronization means 3a generates a write address 21a which controls writing to correspond with 1/m of the data amount M when $m>=2$ and controls writing data into the buffer. Each second to nth subframe synchronization means 3a writes data based on the input frame signal 11 into the buffer. Each second to nth subframe phase synchronization means 3a writes data corresponding to 1/n signal of the input subframe signal when $m=1$. Each second to mth subframe phase synchronization means writes data corresponding to a second to mth input subframe signal when m>=2.

In addition, each second to nth subframe phase synchronization means 3a inputs the position signal 20 for the standard subframe address from the second frame counter 5 and the write/read control signal 16 from the subframe type detector 2. Depending upon these input signals, each second to nth subframe phase synchronization means 3a selects the read address 22 from the first subframe phase synchronization means 3 to control reading data from the buffer when m=1. Each second to mth subframe phase synchronization means 3a generates a read address 22a which controls reading to correspond with 1/m of the data amount M when m>=2 and controls reading from the buffer. Each second to nth subframe phase synchronization means 3a reads data stored in the buffer based on the input frame signal 11. Each second to nth subframe phase synchronization means 3a reads data corresponding to 1/n signal of the input subframe signal from the buffer when m=1. Each second to mth subframe phase synchronization means 3a reads data corresponding to the second to mth input subframe signal from the buffer when m>=2. Thus the input relative phase is synchronized with the standard relative phase and the synchronized signal is output as a second to mth synchronized subframe 17. Signal 18 is the standard clock signal, signal 19 is the standard frame phase signal, signal 23 is the position signal for the standard subframe signal and signal 24 is the synchronized frame signal.

Figure 19:
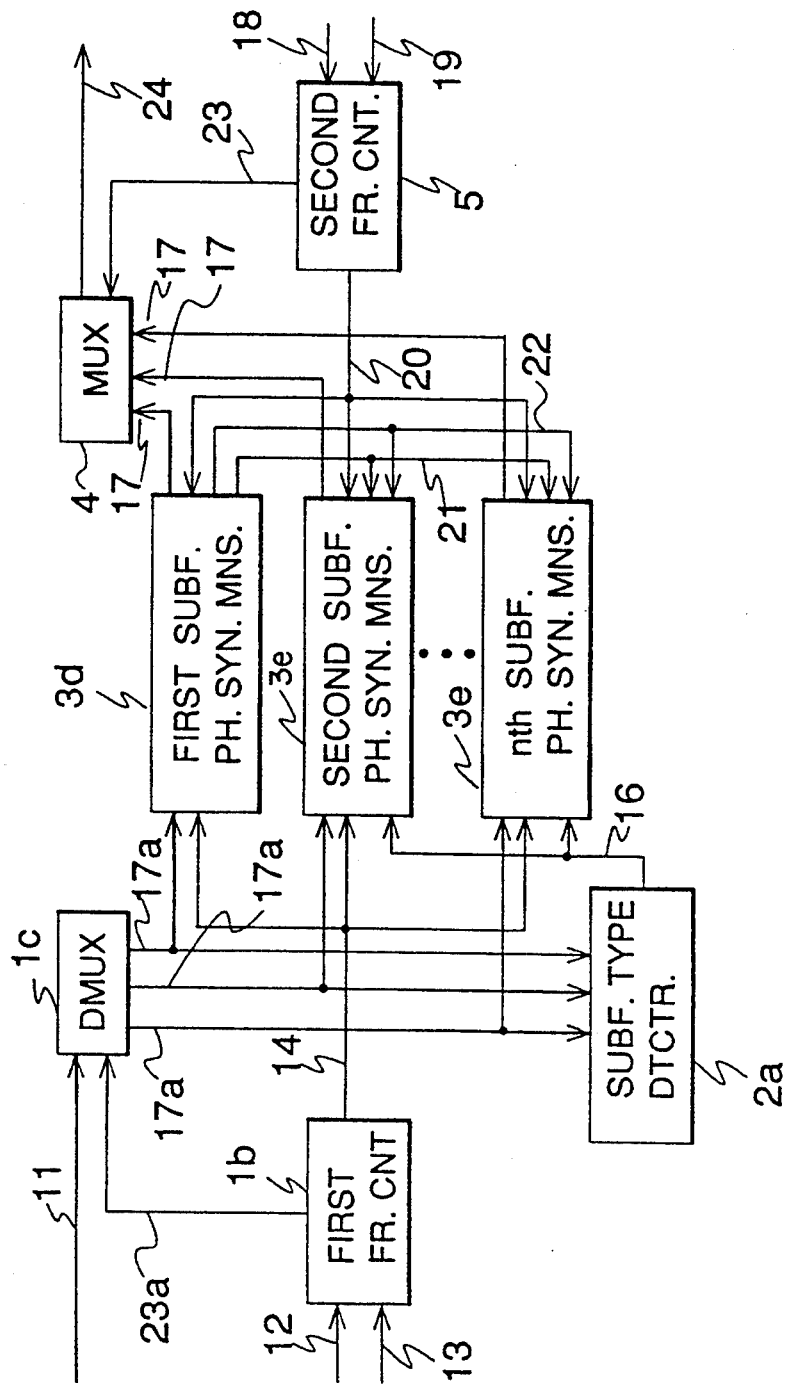
FIG. 19 is a schematic block diagram of a conventional phase synchronization apparatus of TDM frames.

A multiplexer (MUX) 4 and the second frame counter 5 correspond to the MUX 4 and the second frame counter 5 shown in FIG. 19 described in the "Related Art". The MUX 4 and the second frame counter 5 operate in the same way as those of the Related Art.

A system of synchronizing the input relative phase with the standard relative phase without demultiplexing the input frame signal 11 into subframe signals is implemented in this embodiment of the phase synchronization apparatus of TDM frames. The system is called "Phase Synchronization System Without Demultiplexing Frames".

Figure 2:
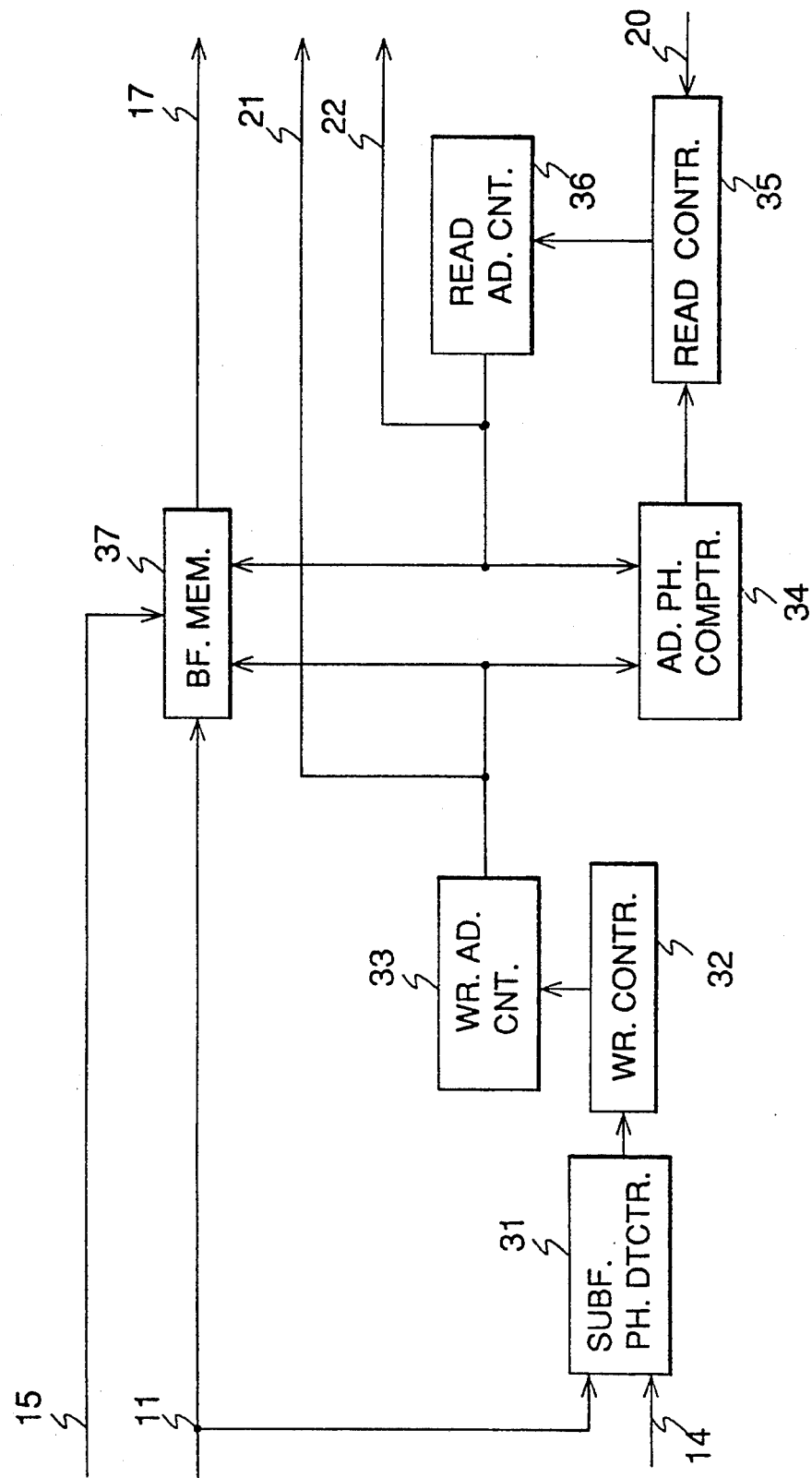
FIG. 2 is a schematic block diagram of a first subframe phase synchronization means shown in FIG. 1.
Figure 20:
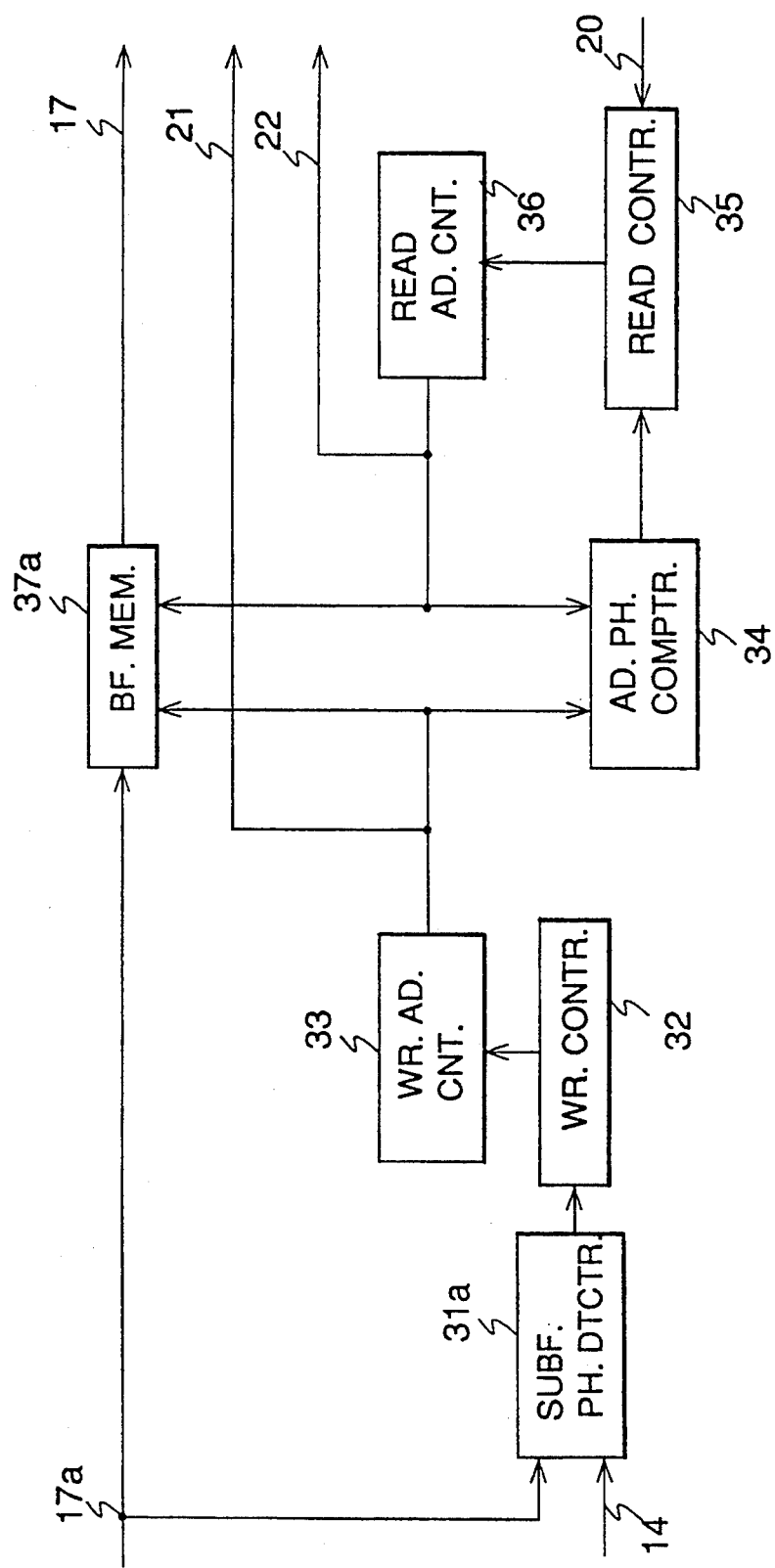
FIG. 20 is a schematic block diagram of a conventional first subframe phase synchronization means shown in FIG. 19.

FIG. 2 shows the first subframe phase synchronization means 3. Depending upon the position signal 14 for the input subframe address from the first frame counter 1, a subframe phase detector 31 detects an input subframe phase of the first input subframe signal in the input frame signal 11. Then, the detector 31 generates an input subframe phase signal. A write controller 32, a read controller 35, a write address counter 33, a read address counter 36 and an address phase comparator 34 in FIG. 2 correspond to 32, 35, 33, 36, 34 in FIG. 20 of the Related Art. The write controller 32, the write address counter 33, the address phase comparator 34, the read controller 35, the read address counter 36 operate in the same way as those of the Related Art. Depending upon the write address enabling signal 15 from the first frame counter 1, the buffer memory 37 writes data into the buffer based on the input frame signal 11 by the write address 21 from the write address counter 33. The buffer memory 37 writes the data corresponding to 1/n signal of the input subframe signal when m=1, or corresponding to the first input subframe signal when m>=2. The buffer memory 37 reads out the data stored in the buffer based on the input frame signal 11 by the read address 22 from the read address counter 36. The buffer memory 37 reads out the data corresponding to 1/n signal of the input subframe signal from the buffer when m=1, or corresponding to the first input subframe signal from the buffer when m>=2. The read out signal is output to the MUX 4 as the first synchronized subframe signal 17.

Figure 3:
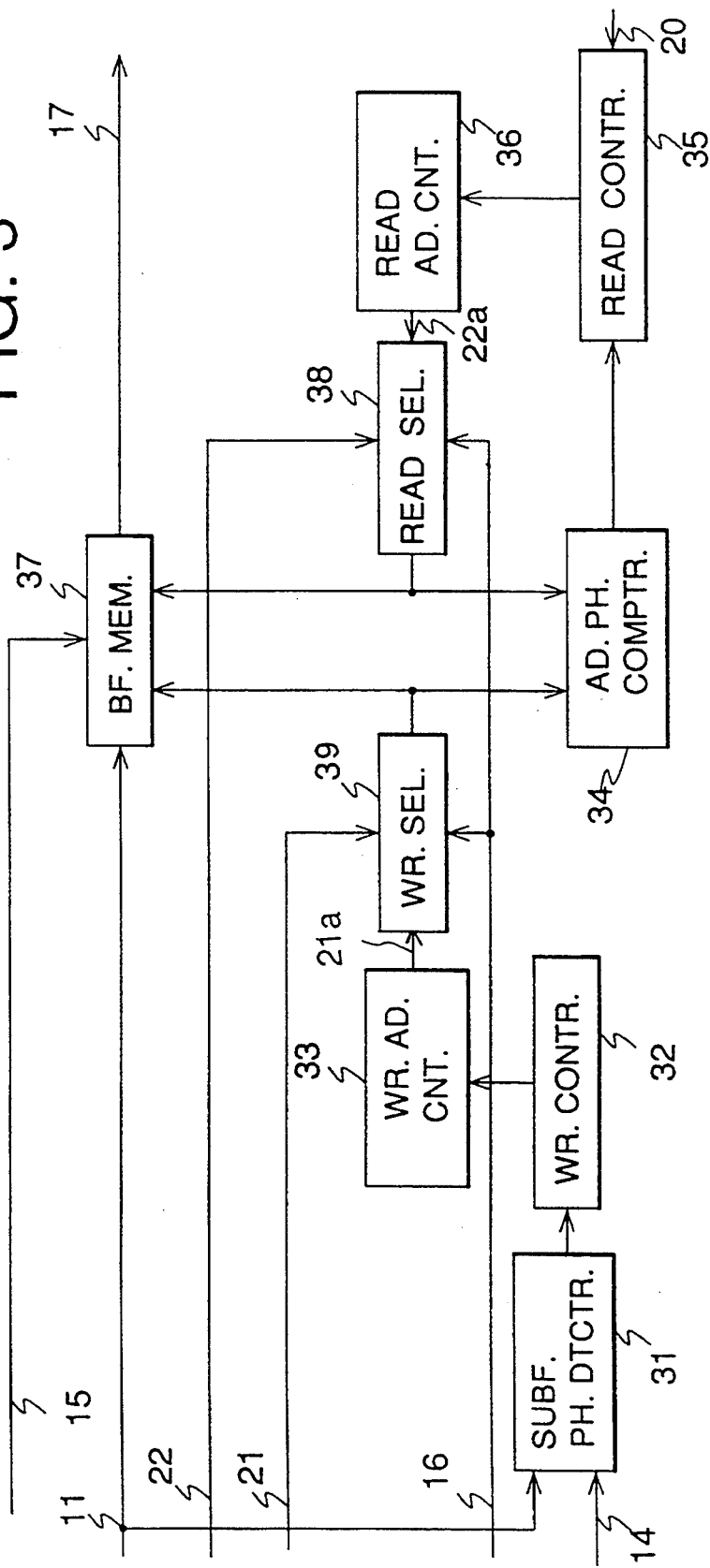
FIG. 3 is a schematic block diagram of a second to nth subframe phase synchronization means shown in FIG. 1.
Figure 21:
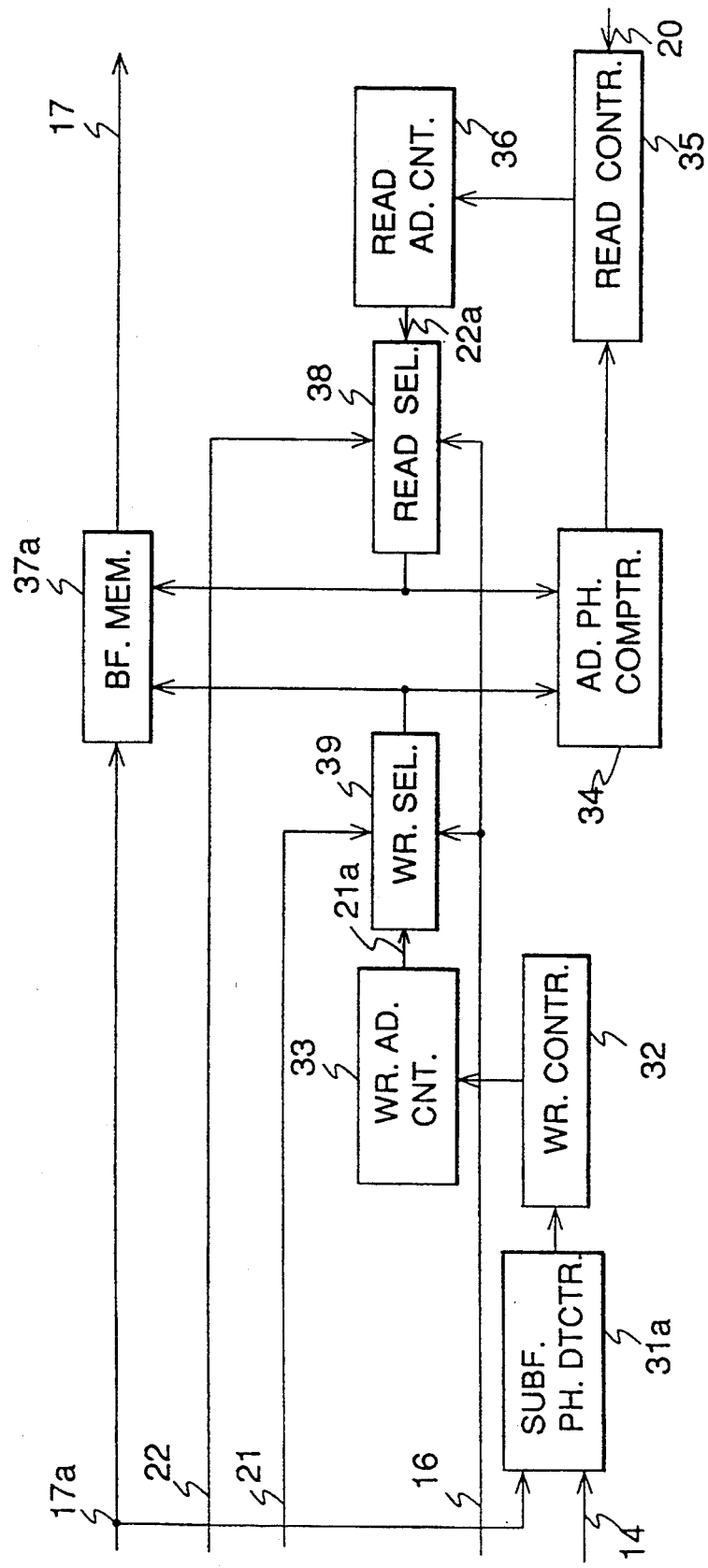
FIG. 21 is a schematic block diagram of a conventional second to nth subframe phase synchronization means shown in FIG. 19.
Figure 22:
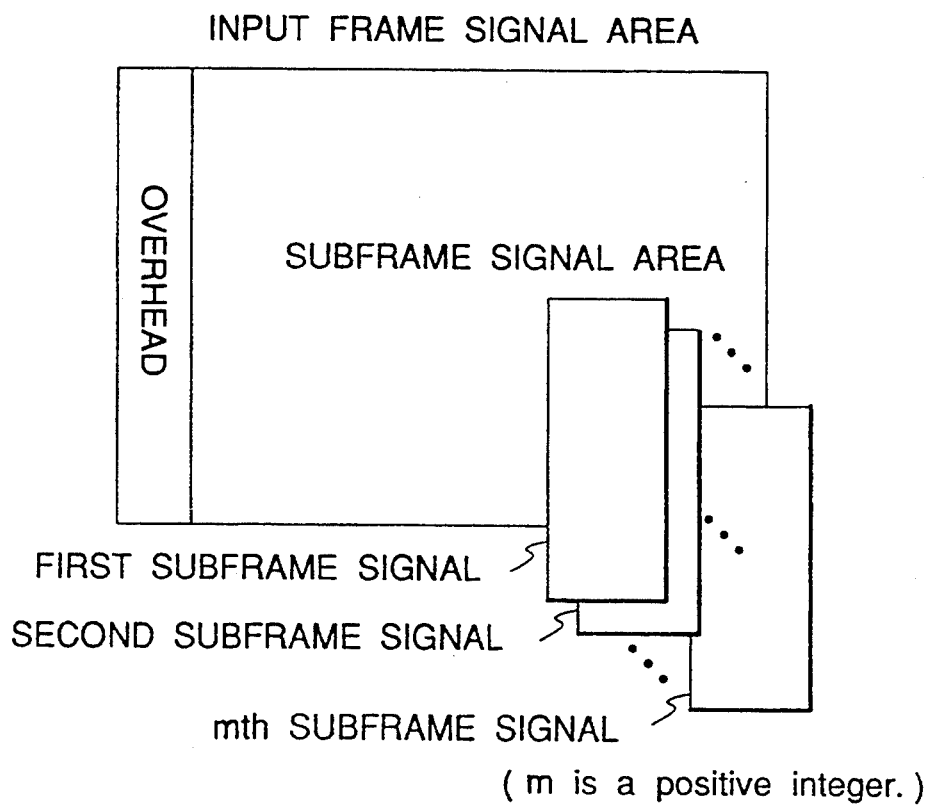
FIG. 22 shows a configuration of a conventional input frame signal area.

FIG. 3 shows each second to nth subframe phase synchronization means 3a. In addition to the configuration of the first subframe phase synchronization means 3, each second to nth subframe phase synchronization means 3a has a write selector 39 and a read selector 38. They correspond to 39 and 38 in FIG. 21 of the Related Art. Depending upon the write/read control signal 16 from the subframe type detector 2, the write selector 39 and the read selector 38 operate in the same way as those of the Related Art.

Figure 23:
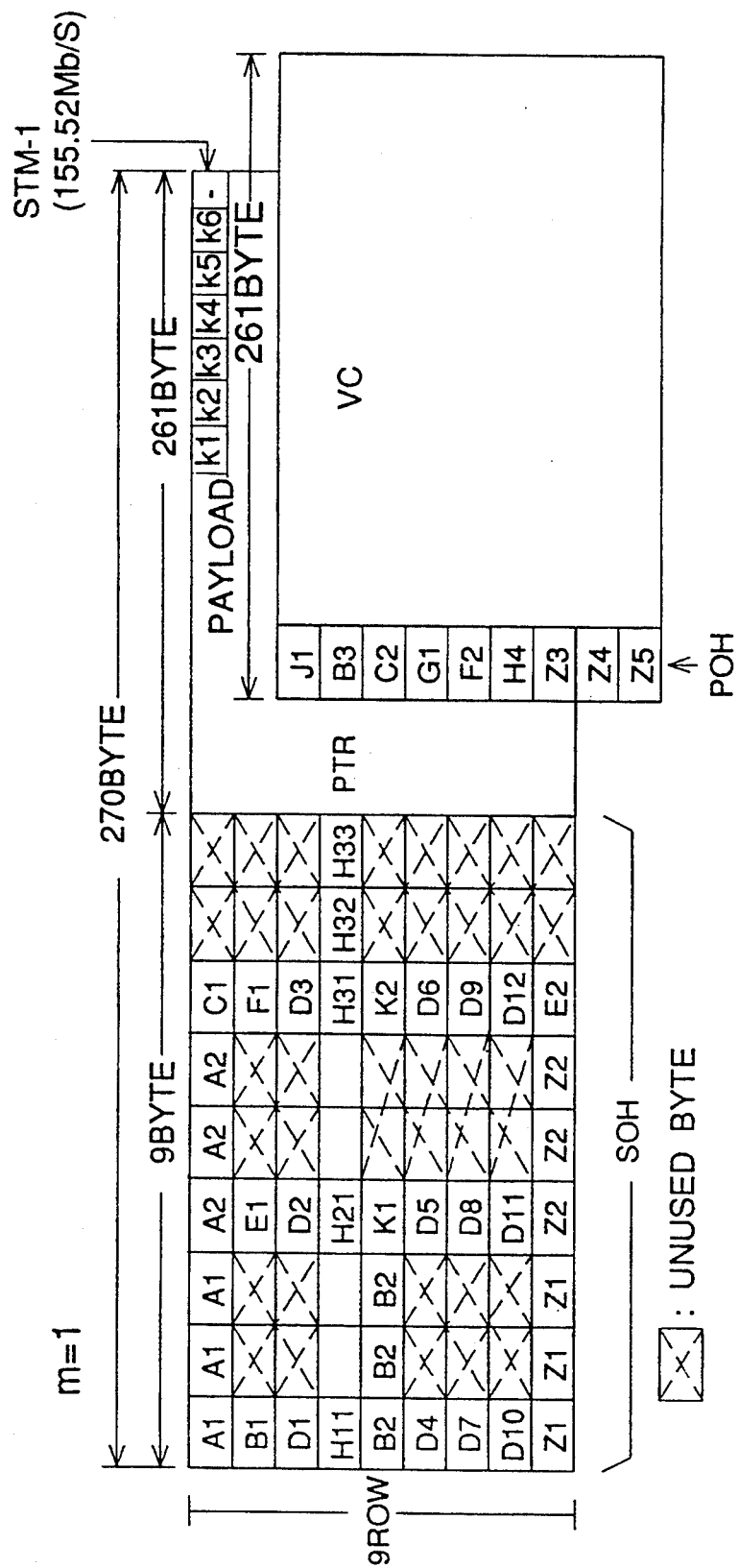
FIG. 23 shows a conventional frame configuration in the case of a multiplexing number being one.
Figure 24:
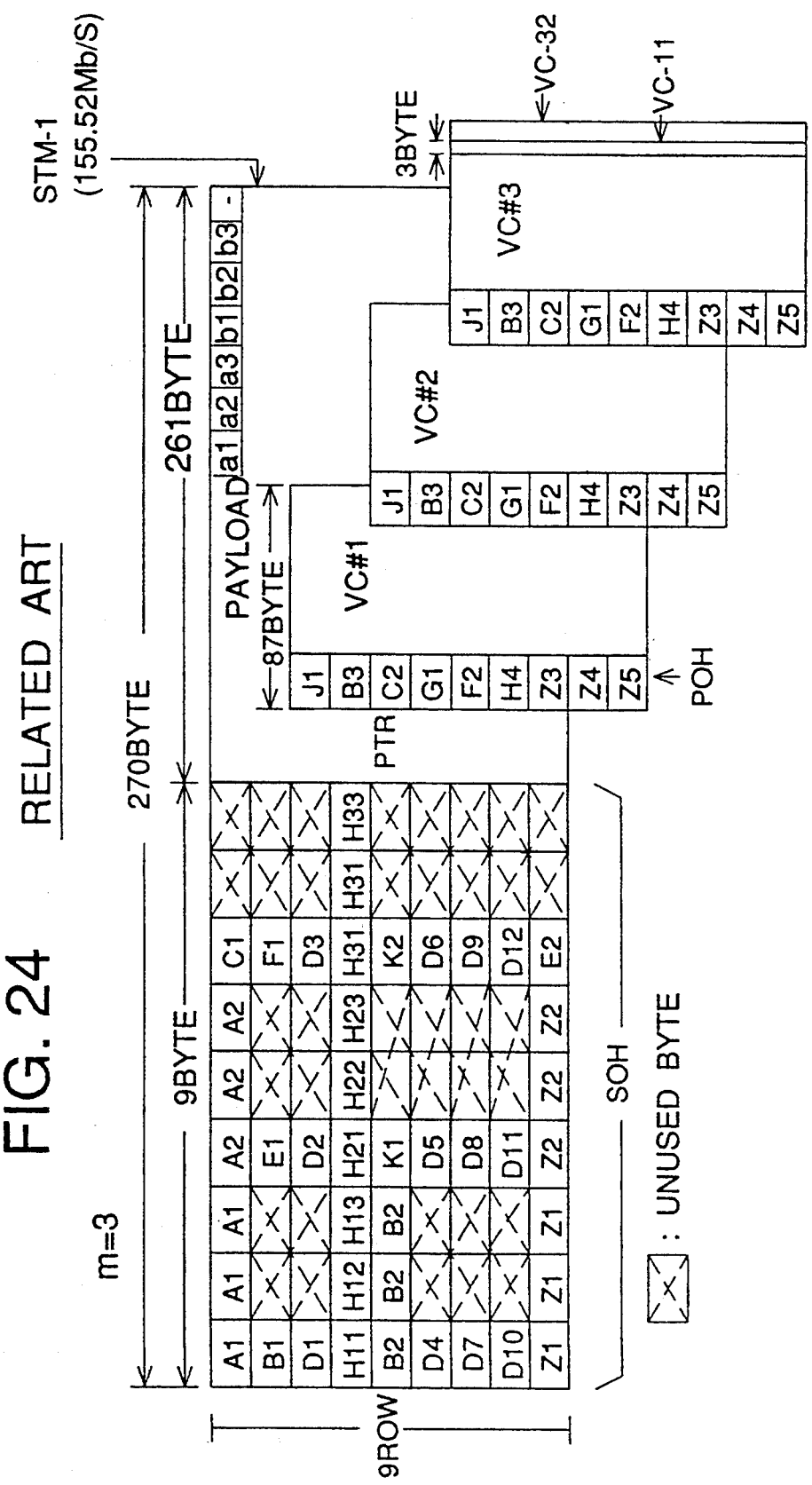
FIG. 24 shows a conventional frame configuration in the case of a multiplexing number being three.
Figure 25:
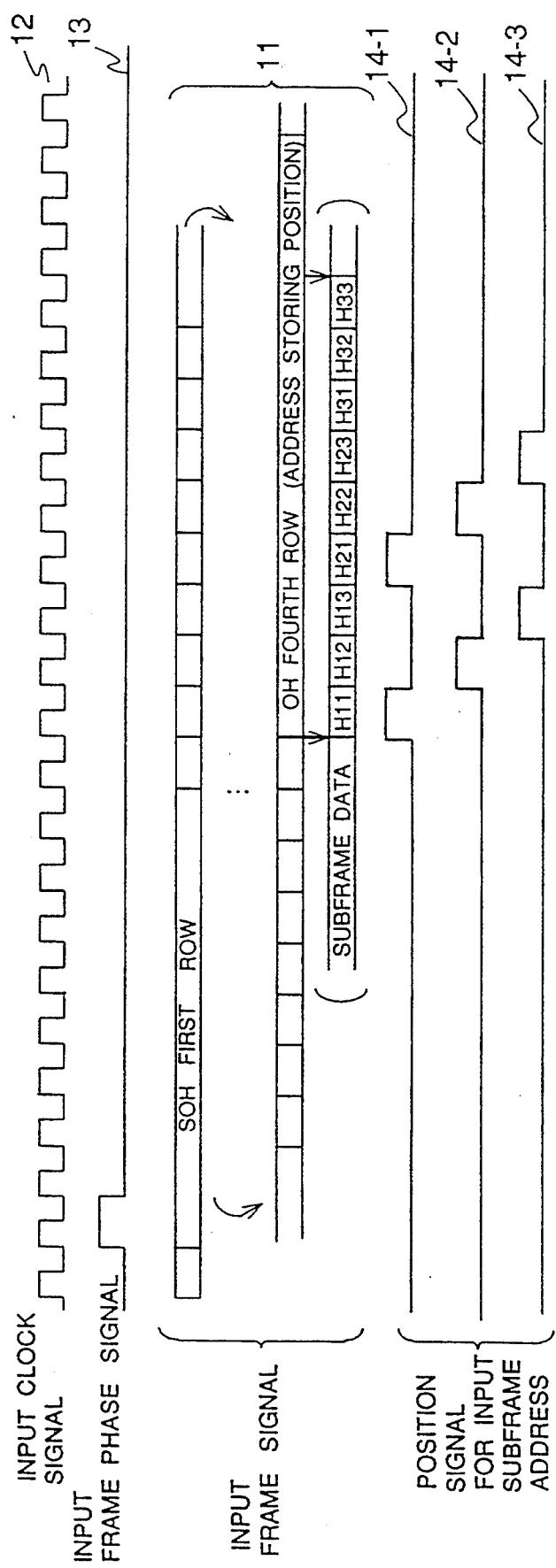
FIG. 25 is a timing chart of a conventional first frame counter.
Figure 27:
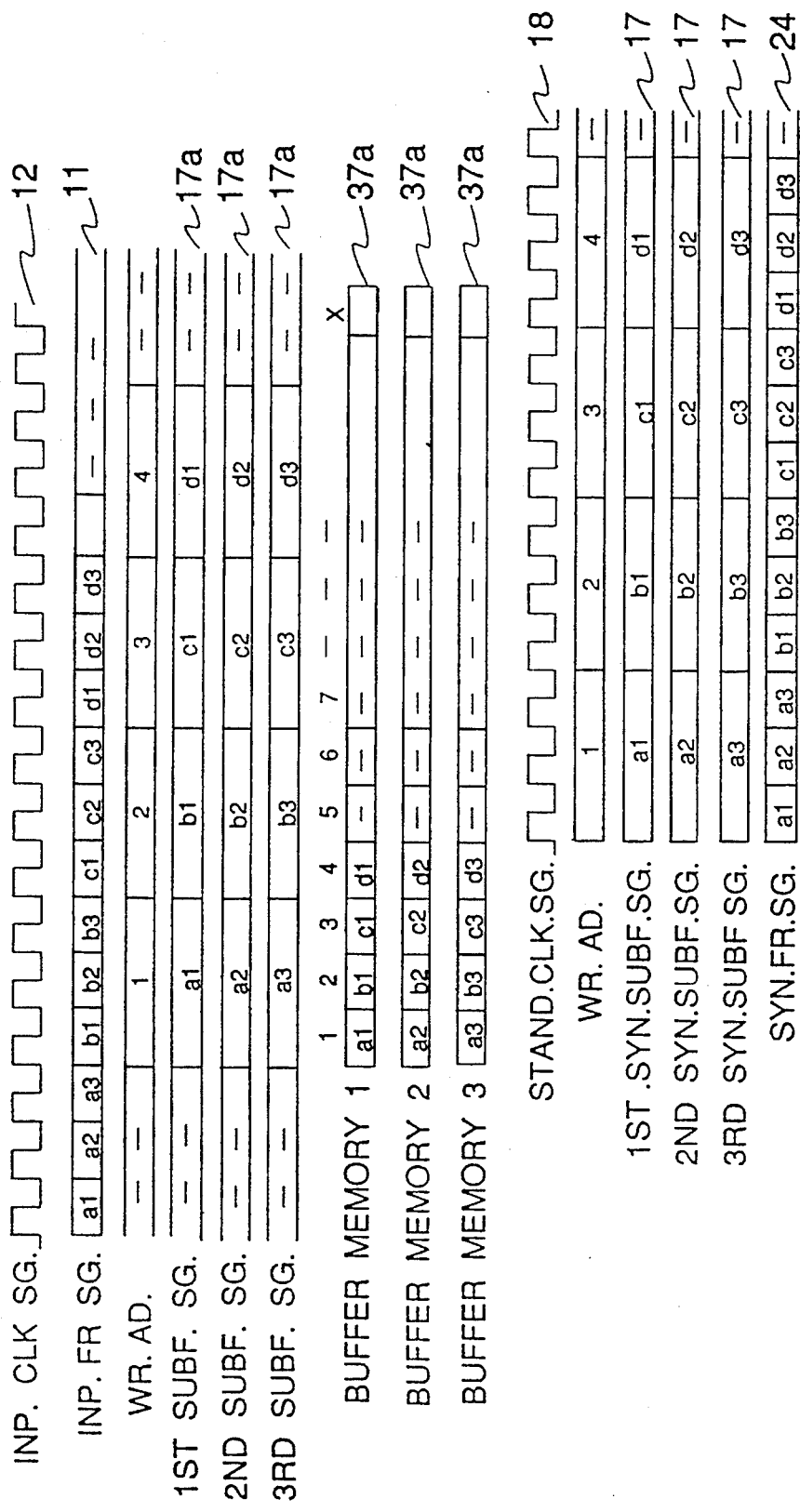
FIG. 27 is a timing chart of the conventional apparatus of FIG. 19 in the case of a multiplexing number being three.
Figure 28:
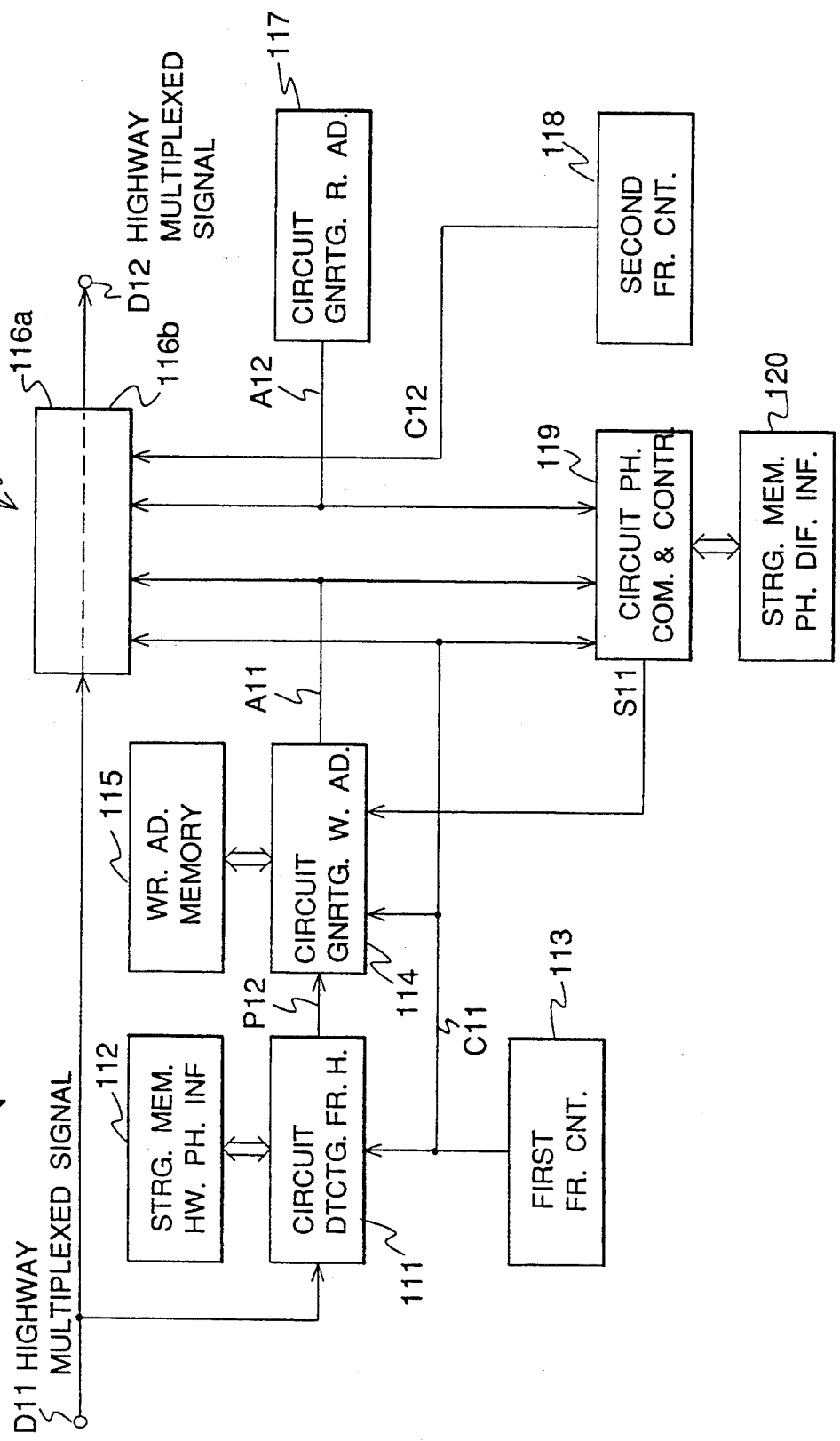
FIG. 28 is a diagram showing an example of a conventional frame aligner.
Figure 29:
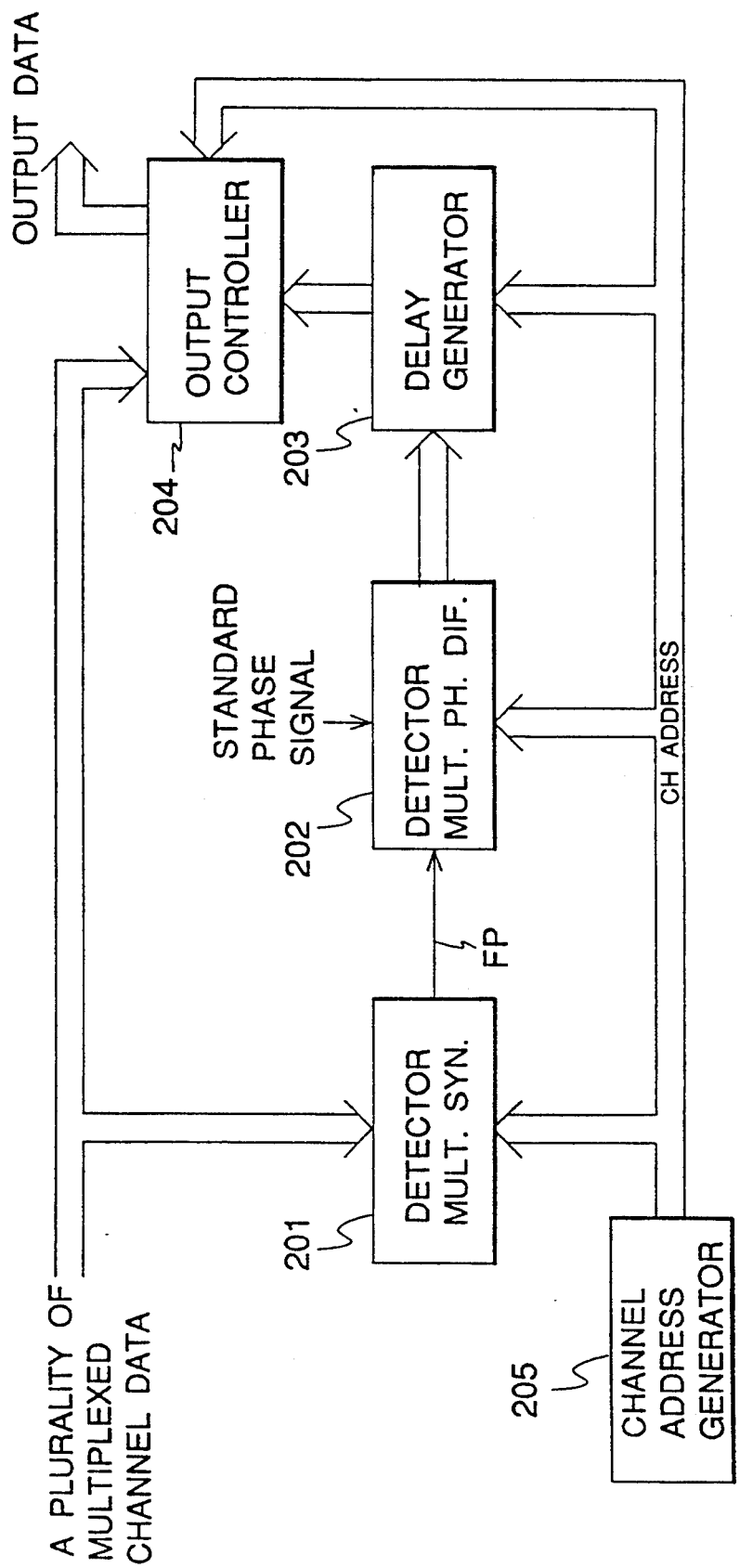
FIG. 29 is a diagram showing an example of a conventional frame aligner.

Now, a concrete example of the function of this embodiment is illustrated using STM-1 frames. The input frame configuration and the result of operation of this embodiment is similar to that of FIG. 23, 24, 25 as described above.

Figure 4:
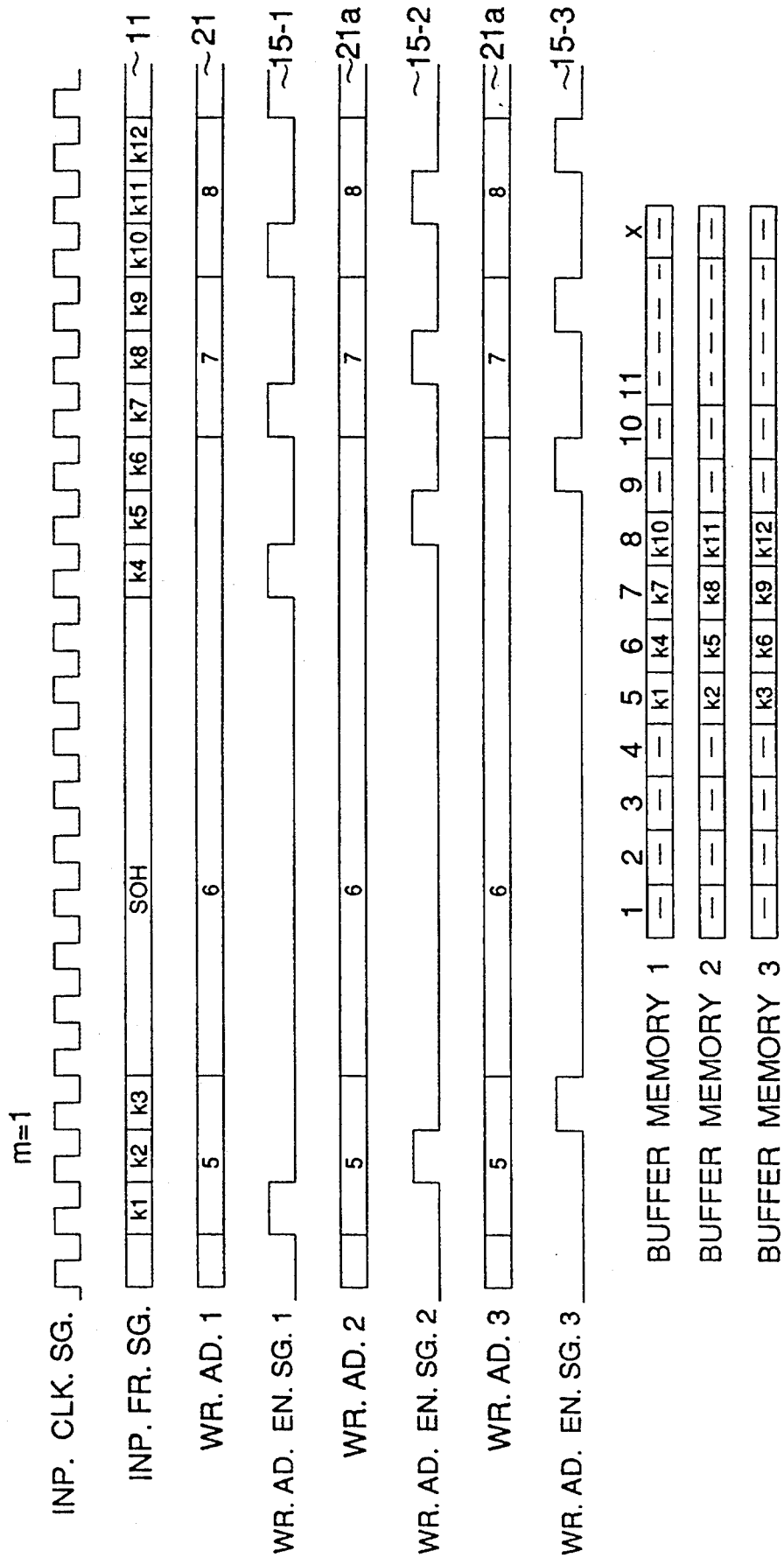
FIG. 4 is a timing chart in the case of a multiplexing number being one.

The case of the multiplexing number being one is illustrated in FIG. 4. A major difference between the case shown in FIG. 4 and the conventional one is that there are write address enabling signals 1, 2, 3, in FIG. 4. The first frame counter 1 outputs the write address enabling signal 1 to the first subframe phase synchronization means 3. The first frame counter 1 outputs the write address enabling signal 2 to the second subframe phase synchronization means 3a. The counter 1 also outputs the write address enabling signal 3 to the third subframe phase synchronization means. The input frame signal 11 has been already input respectively in the first, second, third subframe phase synchronization means. Each subframe phase synchronization means stores data based on the input frame signal to the buffer memory in the case of the write address enabling signal being on.

The example of FIG. 4 shows that the first subframe phase synchronization means 3 makes the buffer memory 1 store the data at the moment when the write address enabling signal 1 becomes on. Therefore data k1, k4, k7 k10 ... are stored in the buffer memory 1. The second subframe phase synchronization means 3a stores the data based on the input frame signal in the buffer memory 2 at the moment when the write address enabling signal 2 becomes on. Therefore data k2, k5, k8, k11 ... are stored in the buffer memory 2. Similarly, the third subframe phase synchronization means 3a writes the data based on the input frame signal into the buffer memory 3 at the moment when the write address enabling signal 3 becomes on. Therefore data k3, k6, k9, k12 ... are stored in the buffer memory 3.

Since the write address 1, 2, 3 indicates the address 5, 6, 7, 8 in this embodiment, each data is written into a specified address. The write address is generated by each subframe phase synchronization means depending upon the position signal 14 for input subframe address.

Figure 5:
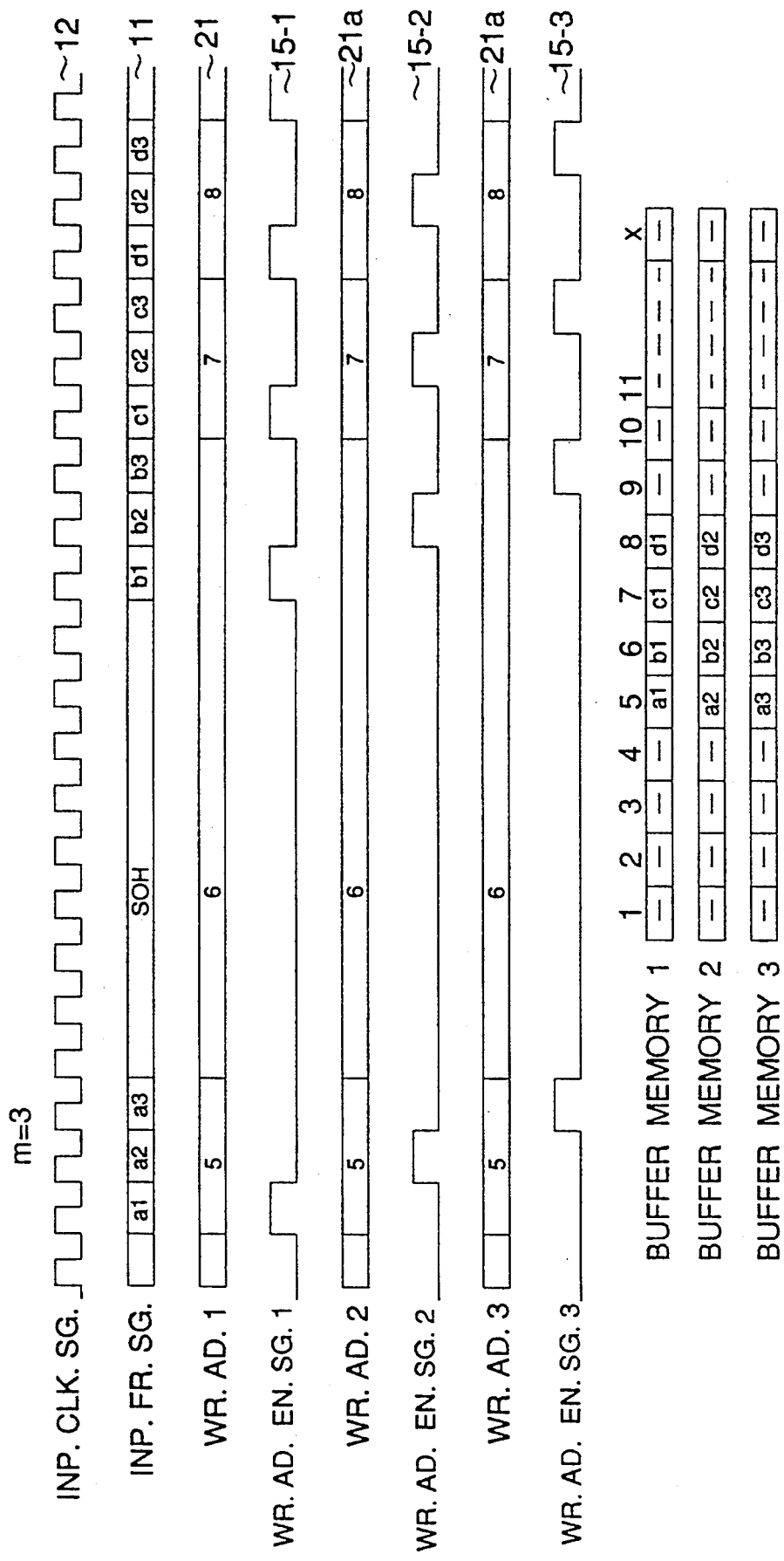
FIG. 5 is a timing chart in the case of a multiplexing number being three.

The case of the multiplexing number being three is illustrated in FIG. 5. FIG. 5 and FIG. 4 differ in that the input frame signal is byte interleaved by each byte of the virtual container in FIG. 5. In other respects, FIG. 5 operates in the same way as shown in FIG. 4.

As explained in FIG. 4 and 5, the data of the input frame signal is stored separately in the buffer memory by the write address enabling signal whether the multiplexing number is 1 or 3. Accordingly, the input frame signal 11 can be stored in the buffer memory separately even if there is no DMUX 1C. The case of reading and multiplexing data from the buffer memory is not shown in FIGS. 4 and 5 because the operation is the same as the conventional one.

Figure 6:
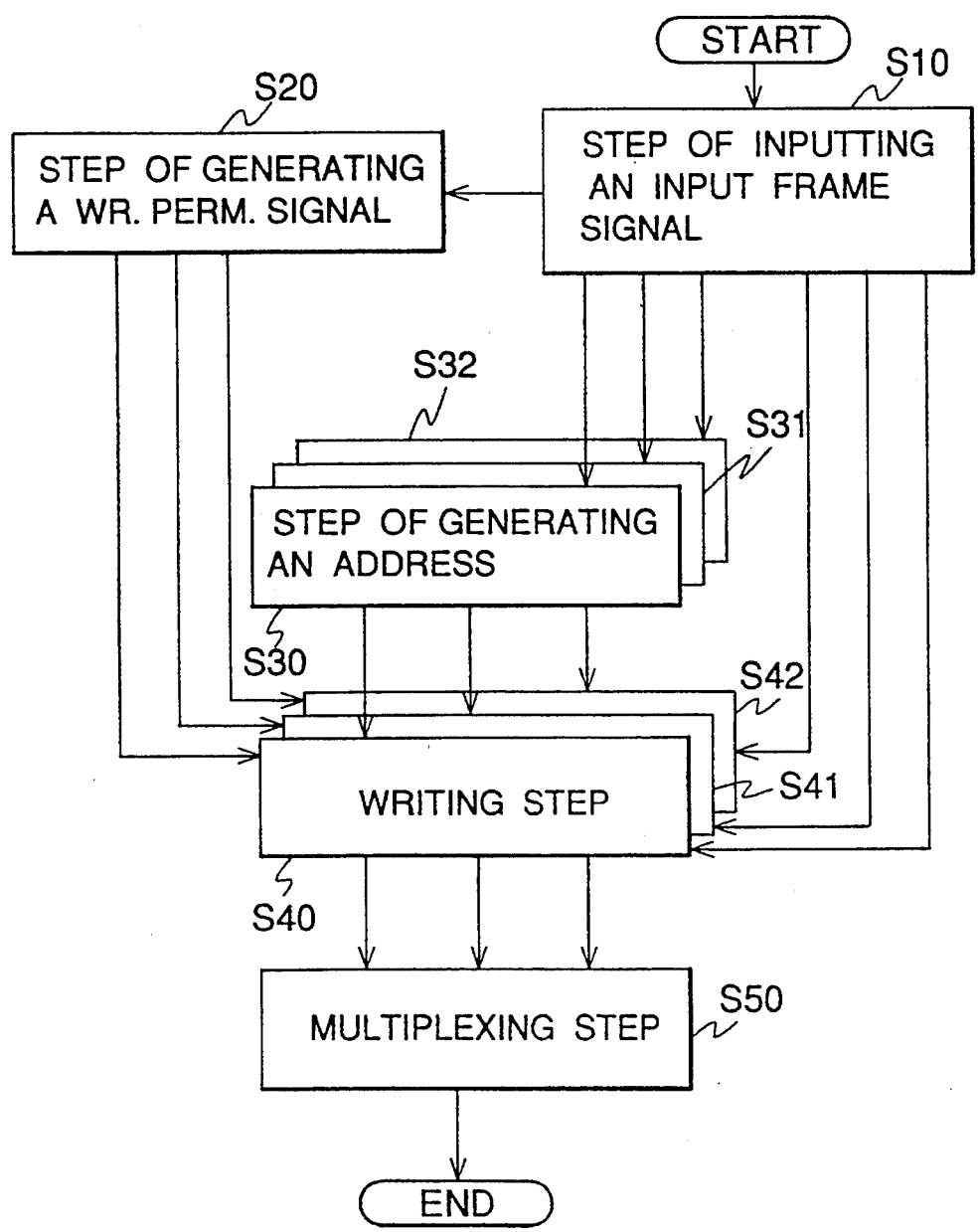
FIG. 6 is a flow chart of a frame phase synchronization method of the present invention.

Now the frame phase synchronization method is presented with FIG. 6.

At a step S10 of inputting the input frame signal in FIG. 6, the input frame signal is input into each subframe phase synchronization means respectively.

At a step S20 of generating the write permission signal, a write permission signal corresponding to the data of each multiplexed subframe is generated and sent to each subframe phase synchronization means.

Each of address generating steps S30, S31, S32 corresponds with each frame phase synchronization means respectively. At each of the address generating steps S30, S31, S32, an address, being synchronized with the input frame signal, for writing data of the input frame signal into the buffer memory is generated.

Each of writing steps S40, S41, S42 corresponds with each subframe phase synchronization means respectively. At each of the writing steps S40, S41, S42, depending upon the address being synchronized with the write permission signal and generated in the address generating step, the data of the input frame is written into the buffer memory.

At a multiplexing step S50, the data written into the buffer memory in the writing step is retrieved, multiplexed and output.

A feature of the flowchart shown in FIG. 6 is that there is no demultiplexing step. There has been a demultiplexing step which demultiplexes the input frame signal conventionally. Instead of the demultiplexing step, there is the step of generating the write permission signal at S20. Depending upon the write permission signal generated at the step of generating the write permission signal, the writing step accomplishes the same object as the demultiplexing step by writing data of the input frame into the buffer memory by time division.

As stated above, the apparatus of this embodiment generates a write permission signal by synchronizing it with each data of each frame. Demultiplexing is done by each subframe phase synchronization means making data stored in the buffer memory by synchronizing with the write permission signal. Accordingly, any special demultiplexing means is not necessary.

The phase synchronization apparatus of TDM frames of this embodiment generates the position signal for the input subframe address, the position signal for the standard subframe address, the write address enabling signal and the position signal for a standard subframe. These signals are generated from the input clock signal, the standard clock signal, the input frame phase signal and the standard frame phase signal. The apparatus generates the write/read control signal corresponding to the multiplexing number of subframe signal (m=1 or m>=2) from the input frame signal.

The first to nth subframe phase synchronization means operate responsive to the position signal for the input subframe address, the position signal for the standard subframe address, the write address enabling signal and the write/read control signal. The first to nth subframe phase synchronization means control the buffer using the write address and the read address to write a first to mth input subframe signal corresponding with 1/n or 1/m of the data amount M from the input frame signal respectively. Finally, the means synchronizes the input relative phase with the standard relative phase and outputs the synchronized signal as the first to mth synchronized subframe signal. The synchronization apparatus multiplexes the first to mth synchronized subframe signal from the first to mth subframe phase synchronization means and outputs the multiplexed signal as the synchronized frame signal.

As the result, the apparatus of this embodiment synchronizes the subframe signal, which is multiplexed having a relative phase with respect to a frame phase, with a relative phase with respect to the standard frame phase in the apparatus.

Main features of this embodiment are as follows.

(1) By controlling writing/reading data into the buffer memory by time division, the multiplexed frame signal is input intact without using a demultiplexing circuit and the frame phase of the multiplexed frame signal is synchronized.

(2) The subframe type detector is provided. By controlling the write/read address of the buffer memory using the detector, it is possible to respond to a signal under an optional multiplexing number automatically.

(3) As is the case of being synchronized with the relative phase, that is, not the case of frame aligner, the buffer memory needs less memory size compared to the frame memory which is required for the frame aligner. The frame memory of the frame aligner needs to store the data for one frame or more to align the heads of a plurality of subframes. The buffer memory of this apparatus need not store the data for one or more frames. Accordingly, the memory size of the buffer memory can be much reduced.

Embodiment 2

Figure 7:
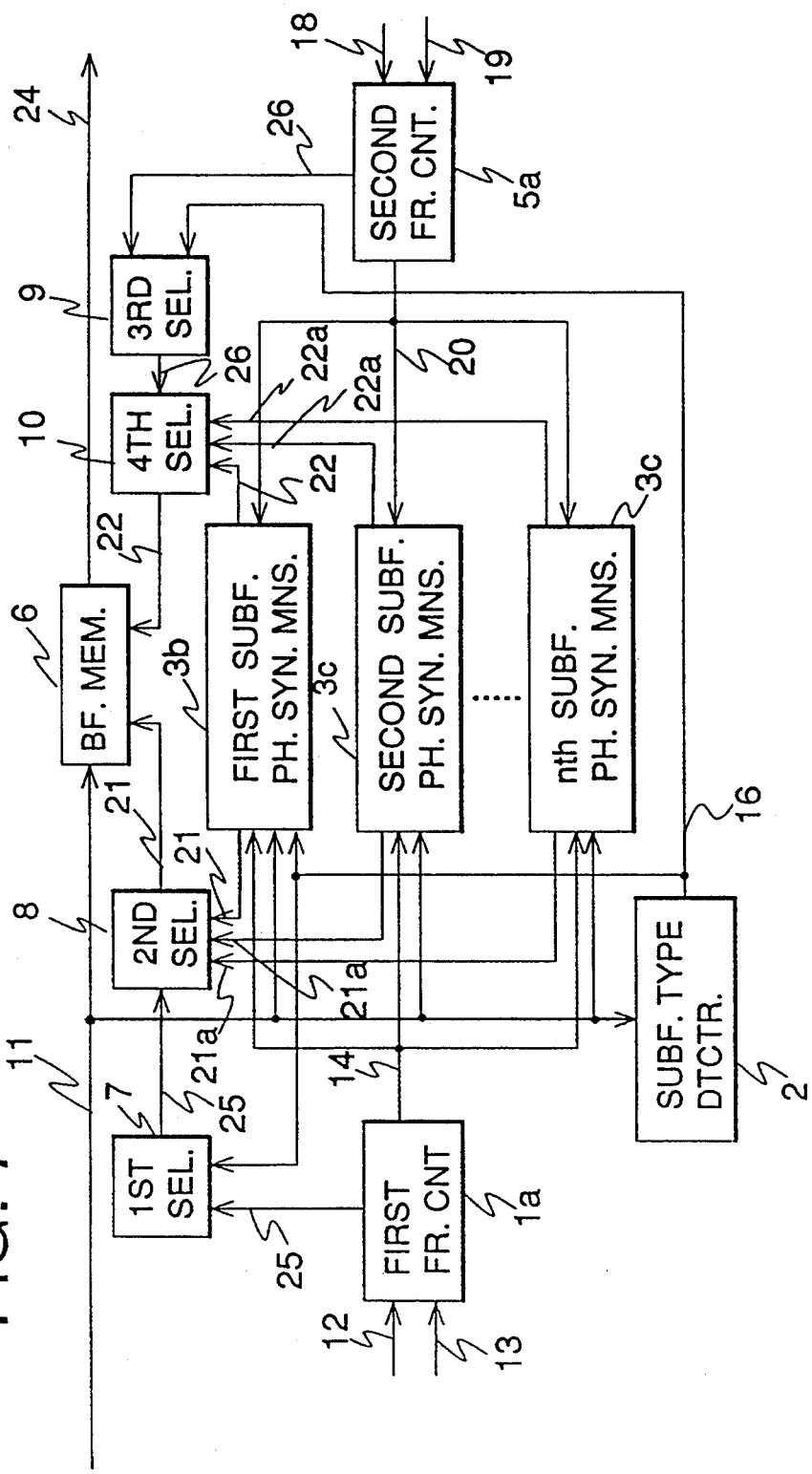
FIG. 7 is a schematic block diagram showing another example of the present invention.

The system without using the MUX 4 is shown in FIG. 7. In this case, signals might be multiplexed directly after frame phases being synchronized.

A first frame counter 1a generates the position signal 14 for the input subframe address which is synchronized with the input clock signal 12 based on the input frame phase signal 13. The frame counter 1a also generates a write address selection signal 25 being synchronized with the input subframe phase signal 20 for the standard subframe address which is synchronized with a standard clock signal 18 based on a standard frame phase signal 19. The frame counter 5a also generates a read address selection signal 26 being synchronized with a standard subframe phase.

A subframe type detector 2 corresponds to the subframe type detector 2 shown in FIG. 1 of the Embodiment 1. The detector 2 operates in the same way as that of the Embodiment 1.

Figure 8:
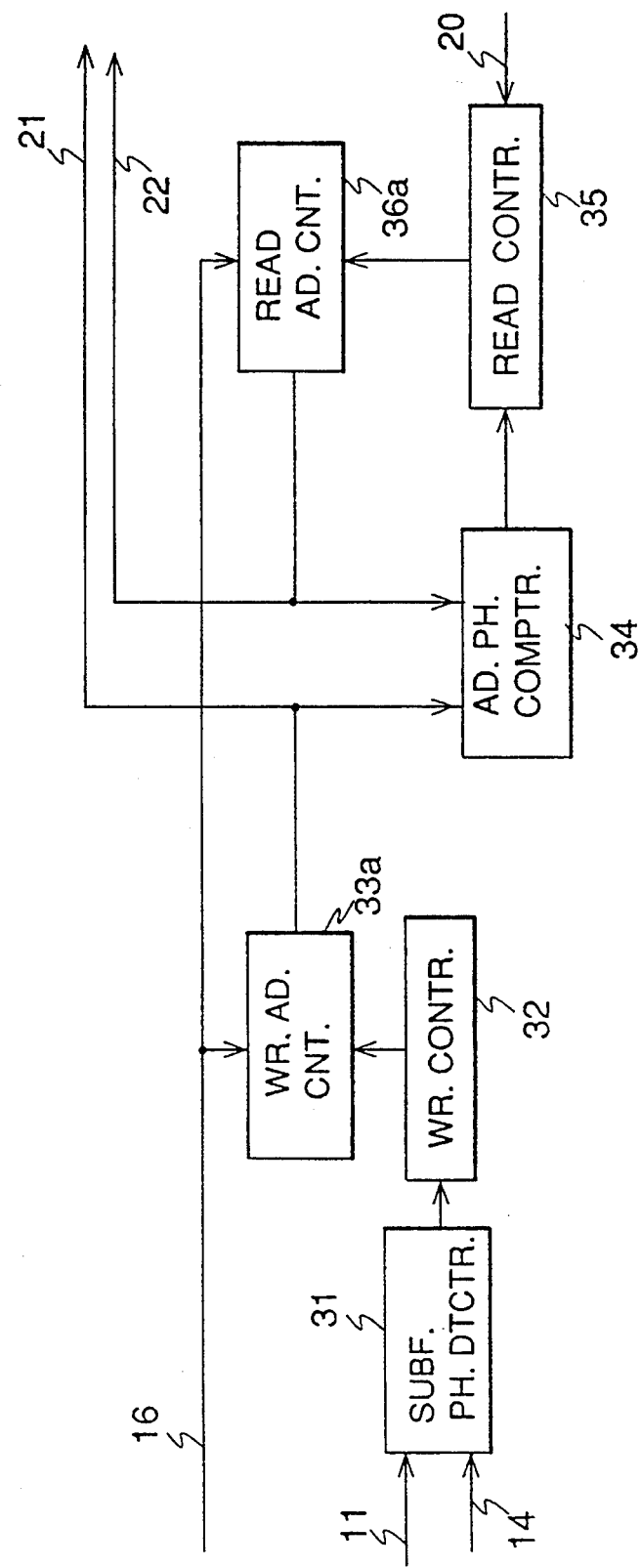
FIG. 8 is a schematic block diagram of a first subframe phase synchronization means shown in FIG. 7.

FIG. 8 shows a first subframe phase synchronization means 3b. A subframe phase detector 31, a write controller 32, a read controller 35 and an address comparator 34 corresponds to 31, 32, 35 34 in FIG. 2 of the Embodiment 1. The subframe phase detector 31, the write controller 32, the address phase comparator 34, the read controller 35 operates in the same way as those of the Embodiment 1.

A write address counter 33a inputs the position signal 14 for the input subframe address from the first frame counter 1a and the write/read control signal 16 from the subframe type detector 2. Depending upon these input signals, the write address counter 33a generates the write address 21 corresponding to the data amount M when m=1 or corresponding to 1/m of M when m>=2 based on the input frame signal 11 and controls writing the data into the buffer.

A read address counter 36a inputs the position signal 20 for the standard subframe address from the second frame counter 5a and the write/read control signal 16 from the subframe type detector 2. Depending upon these input signals, the read address counter 36a generates the read address 22 corresponding to the data amount M when m=1 or corresponding to 1/m of M when m>=2 based on the input frame signal 11 and controls reading from the buffer. Thus, the input relative phase is synchronized with the standard relative phase.

Figure 9:
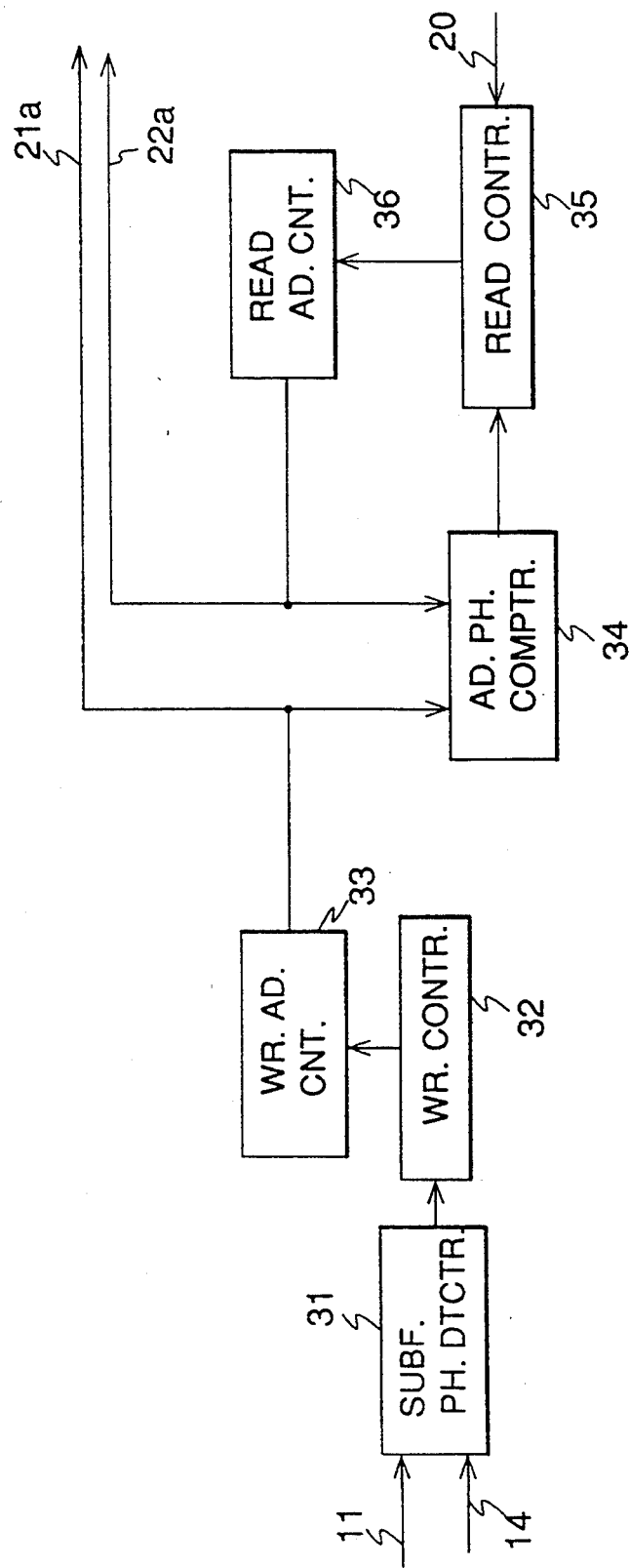
FIG. 9 is a schematic block diagram of a second to nth subframe phase synchronization means shown in FIG. 7.

FIG. 9 shows each second to nth subframe phase synchronization means 3c. Instead of the write address counter 33a and the read address counter 36a used for the first subframe phase synchronization means 3b, each second to nth subframe phase synchronization means 3c has a write address counter 33 and a read address counter 36.

The counters 33, 36 corresponds to 33, 36 in FIG. 3 of the Embodiment 1. The write address counter 33 and the read address counter 36 are not controlled by the write/read control signal 16 from the subframe type detector 2.

Depending only upon the position signal 14 for the input subframe address from the first frame counter 1a, each second to mth subframe phase synchronization means 3c generates the write address 21a based on the input frame signal 11 corresponding to 1/m of the data amount M. Each synchronization means 3c controls writing data into the buffer.

Depending only upon the position signal 20 for the standard subframe address from the second frame counter 5a, each second to nth subframe phase synchronization means 3c generates the read address 22a based on the input frame signal 11. The read address corresponds with 1/m of the data amount M. Each synchronization means 3c controls reading data from the buffer. Thus the input relative phase is synchronized with the standard relative phase.

Depending upon the write address 21 from a second selector 8, a buffer memory 6 stores a first to mth synchronized subframe signal effectively demultiplexing. The first to mth synchronized subframe signal is made from the input frame signal 11 by synchronizing the input relative phase of the first to mth input frame signal with the standard relative phase.

Depending upon the read address 22 from a fourth selector 10, the buffer memory 6 outputs the first to mth synchronized subframe signal, stored in the buffer, as a synchronized frame signal 24 effectively multiplexing. However, no demultiplexer or multiplexer are used.

Depending upon the write/read control signal 16 from the subframe type detector 2, a first selector 7 selects the write address selection signal 25 from the first frame counter 1a.

Depending upon the write/read control signal 16 from the subframe type detector 2, a third selector 9 selects the read address selection signal 26 from the second frame counter 5a.

Depending upon the write address selection signal 25 from the first selector 7, the second selector 8 selects the write address 21 from the first subframe phase synchronization means 3b and the write address 21a from the second to nth subframe phase synchronization means 3c in turn.

Depending upon the read address selection signal 26 from the third selector 9, the fourth selector 10 selects the read address 22 from the first subframe phase synchronization means 3b and the read address 22a from the second to nth subframe phase synchronization means 3c in turn.

Figure 10:
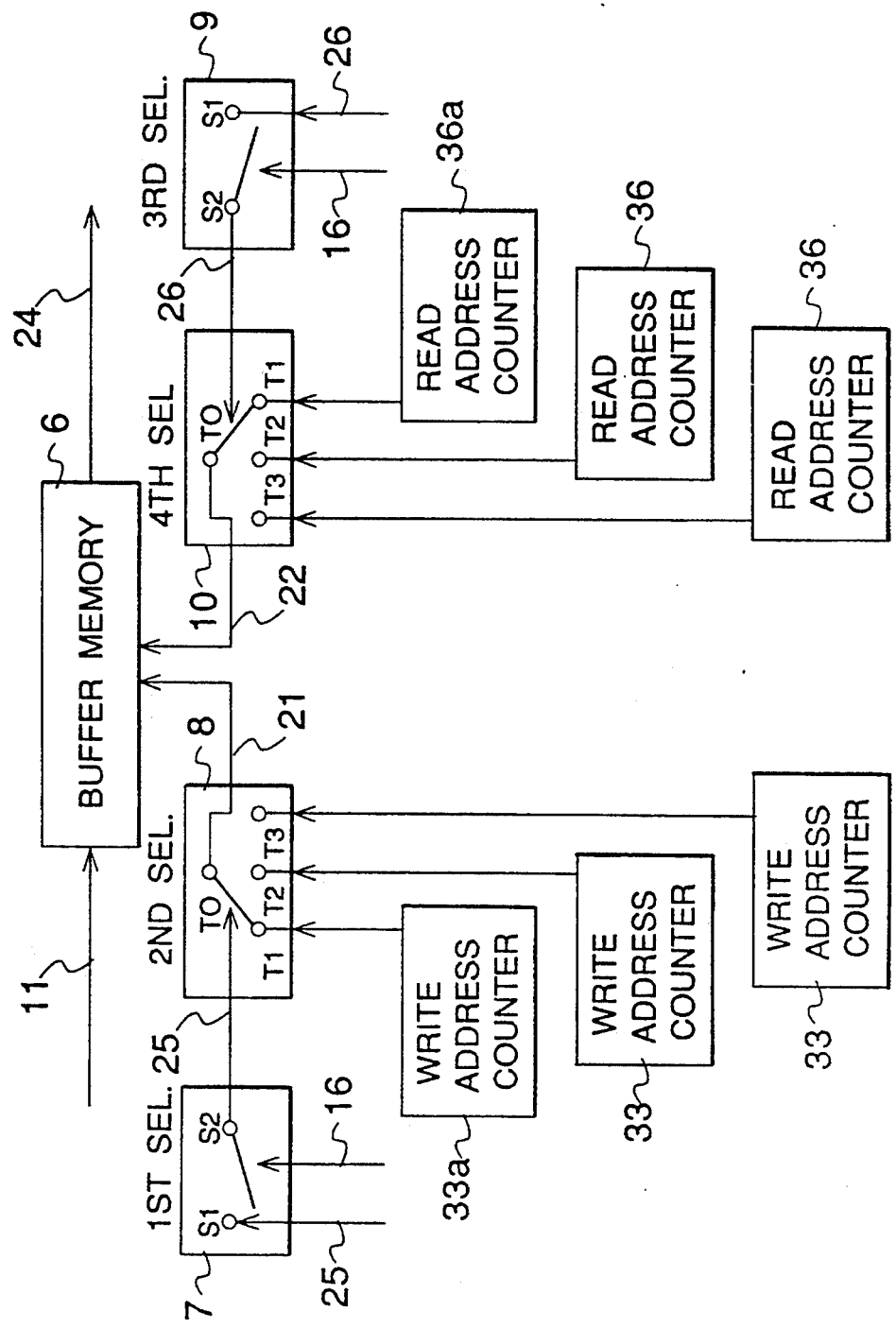
FIG. 10 is a diagram showing an operation of a selector.
Figure 11:
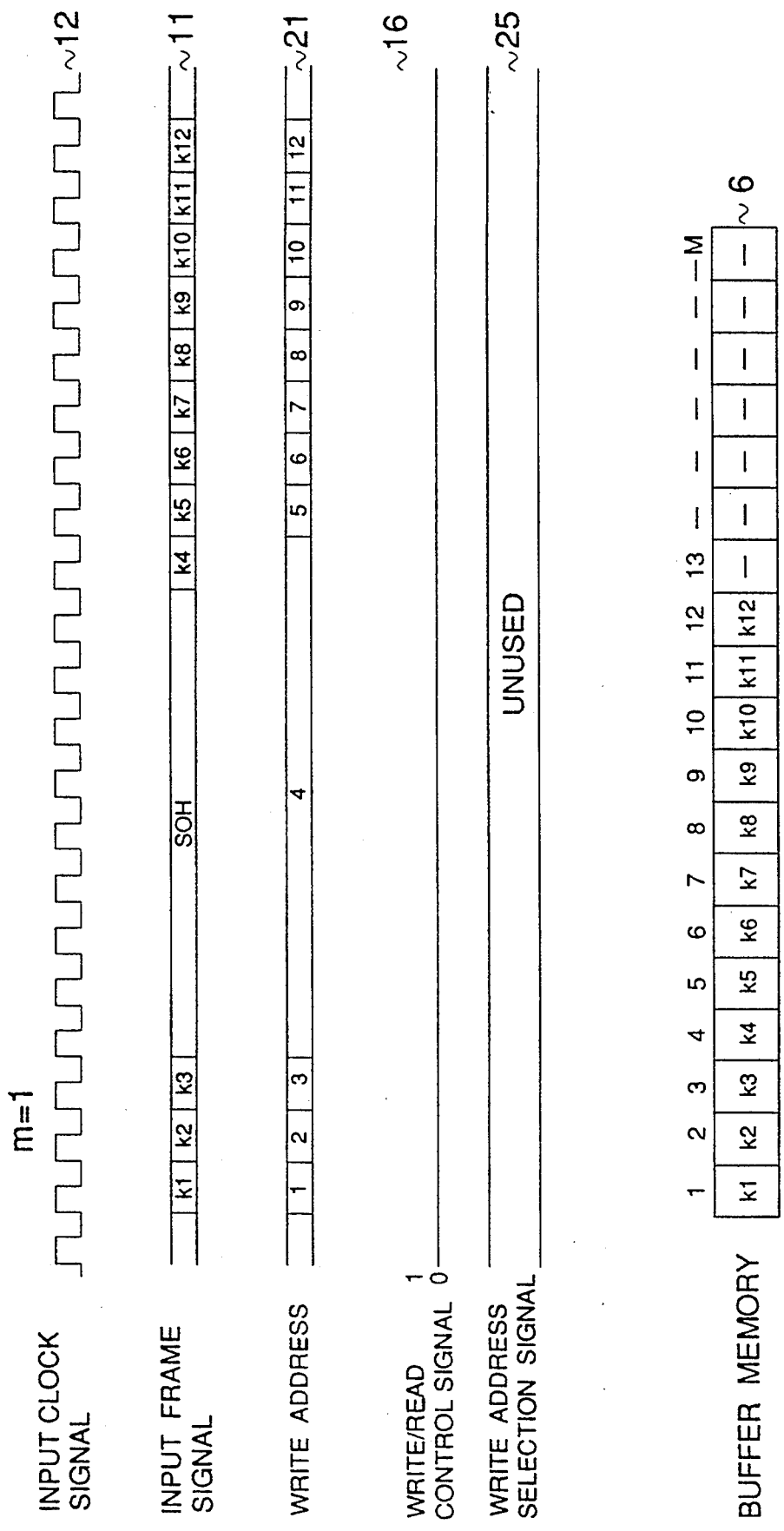
FIG. 11 is a timing chart in the case of a multiplexing number being one.
Figure 12:
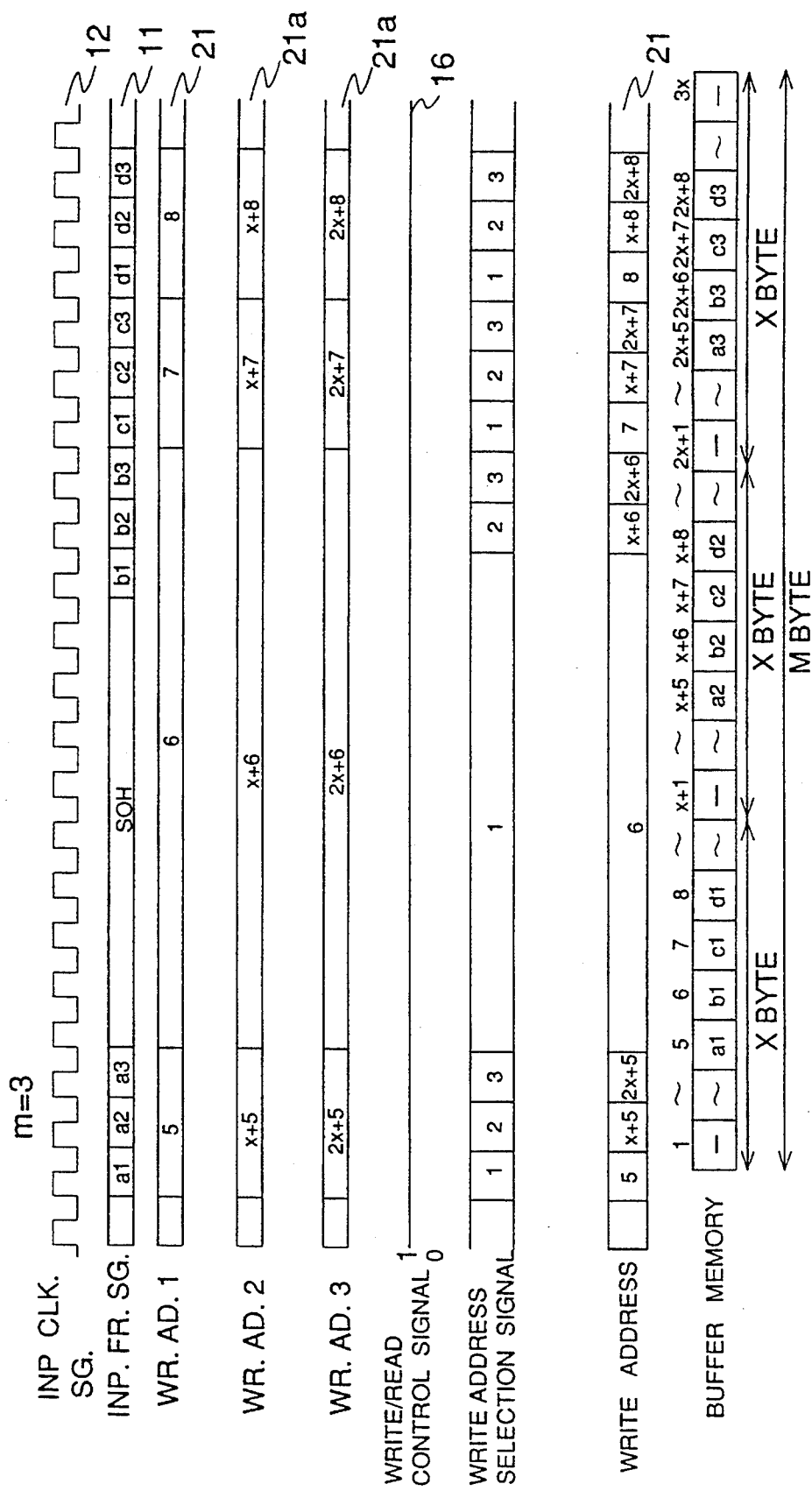
FIG. 12 is a timing chart in the case of a multiplexing number being three.

A concrete example of this embodiment is illustrated in FIG. 10. FIG. 10 presents an operation of selectors. FIG. 11 is a timing chart in the case of the multiplexing number being one. FIG. 12 is that of the multiplexing number being three.

The case of the multiplexing number being one is explained with FIGS. 10 and 11. When the multiplexing number is one, the write address 21 is increased at every byte of the input frame signal and the data is stored into the buffer memory 6 in order. The write/read control signal 16 is 0(zero) when the multiplexing number is one. The first selector 7 inputs the signal 16 and turns the switch off as shown in FIG. 10. Therefore, a write address selection signal 25 is not output to the second selector 8. When no write address selection signal comes from the first selector 7, the second selector 8 selects a write address generated from the write address counter 33a of the first subframe phase synchronization means 3b.

Namely, the second selector connects T0 and T1 placed within it and outputs the write address 21 to the buffer memory 6. The first subframe phase synchronization means 3b increases the write address counter 33a at every byte of the input frame signal 11. A write address 1, 2, 3, 4, 5 is generated against data k1, k2, k3, k4, k5 of the input frame signal 11 respectively as shown in FIG. 11. Thus, data following k1 is stored into contiguous addresses of the buffer memory.

In the case of reading, since the write/read control signal 16 is 0(zero) like the above case, the read address selection signal 26 generated from the second frame counter 5a is not output from the third selector. When the read address selection signal 26 is not output from the third selector 9, the fourth selector 10 selects a read address generated from the read address counter 36a of the first subframe phase synchronization means 3b.

Namely, T0 and T1 in the fourth selector 10 are connected and a read address from the read address counter 36a is used as the read address 22 of the buffer memory. The read address counter 36a increases the address at every byte. Therefore the data k1, k2, k3 . . . stored in the buffer memory is output as the synchronized frame signal 24 in order.

In the case of the multiplexing number being one, the write address counters 33 and the read address counters 36 shown in FIG. 10 are not used because the second selector and the fourth selector don't select them.

The case of the multiplexing number being three is explained with FIGS. 10 and 12. Assuming that a specific amount of data is called M and an amount of M multiplied by 1/m is called x (M/3 =x). Three write address counters shown in FIG. 10 count per x bytes respectively. The write address counter 33a counts bytes from 1 to x. The write address counter 33 of the second subframe phase synchronization means counts bytes from x+1 to 2x. The read address counter 33 of the third subframe phase synchronization means counts bytes from 2x+1 to 3x.

In FIG. 12 the write address 1 is output from the write address counter 33a. The write address 2 is output from the write address counter 33 of the second subframe phase synchronization means. The write address 3 is output from the write address counter 33 of the third subframe phase synchronization means. In the case of the multiplexing number being three, the write/- read control signal 16 outputs 1. The first frame counter 1a outputs values 1, 2, 3 corresponding to the subframes in turn as a write address selection signal 25. In FIG. 10, the first selector 7 outputs the write address selection signal 25 from the first frame counter 1a to the second selector since the write/read control signal 16 is 1. The second selector 8 switches a connection between T0 and T1, T0 and T2, T0 and T3 depending upon a value of the inputted write address selection signal 25. When the write address selection signal is 1, T1 is connected with T0. When the selection signal is 2, T2 is connected with T0. When the selection signal is 3, T3 is connected with T0. Thus the second selector switches and selects the write address received from each address counter in turn.

As shown in FIG. 12, when the write address 1 indicates address 5, the write address 2 indicates address $x+5$ and the write address 3 indicates address $2x+5$, address 5 is output as the write address by a connection of T0 and T1. Address $x+5$ is output by a connection of T0 and T2 as the write address. Address $2x+5$ is output by a connection of T0 and T3. Accordingly, data a1 of the input frame signal is stored in an address 5 of the buffer memory. Data a2 is stored in an address $x+5$ of the buffer memory. Data a3 is stored in $2x+5$. Similarly, data b1, b2, b3 is stored in an address 6, $x+6$, $2x+6$ respectively.

Now an operation of the reading is going to be explained. When the write/read control signal 16 is 1, the read address selection signal 26 is output to the fourth selector from the third selector. The read address selection signal 26 having the values 1, 2, 3 in turn is output like the write address selection signal shown in FIG. 12. The fourth selector 10 switches the connection between T0 and T1. T0 and T2, T0 and T3 in turn depending upon the value of the inputted read address selection signal 26. Three read address counters output addresses from 1 to x, from $x+1$ to $2x$ and from $2x+1$ to $3x$ respectively like the write address counters stated above. The fourth selector selects the addresses in turn and outputs them to the buffer memory as the read address 22.

Therefore, for instance when the address 5 is output first by a connection of T0 and T1, the address $x+5$ is output secondly by a connection of T0 and T2, and the address $2x+5$ is output by T0 and T3 thirdly. In this way, data a1, a2, a3 is multiplexed and output as the synchronized frame signal 24.

As explained above, it is possible to convert the input frame signal being synchronized with the input clock signal to the synchronized frame signal being synchronized with the standard clock signal without using the DMUX and MUX.

Figure 13:
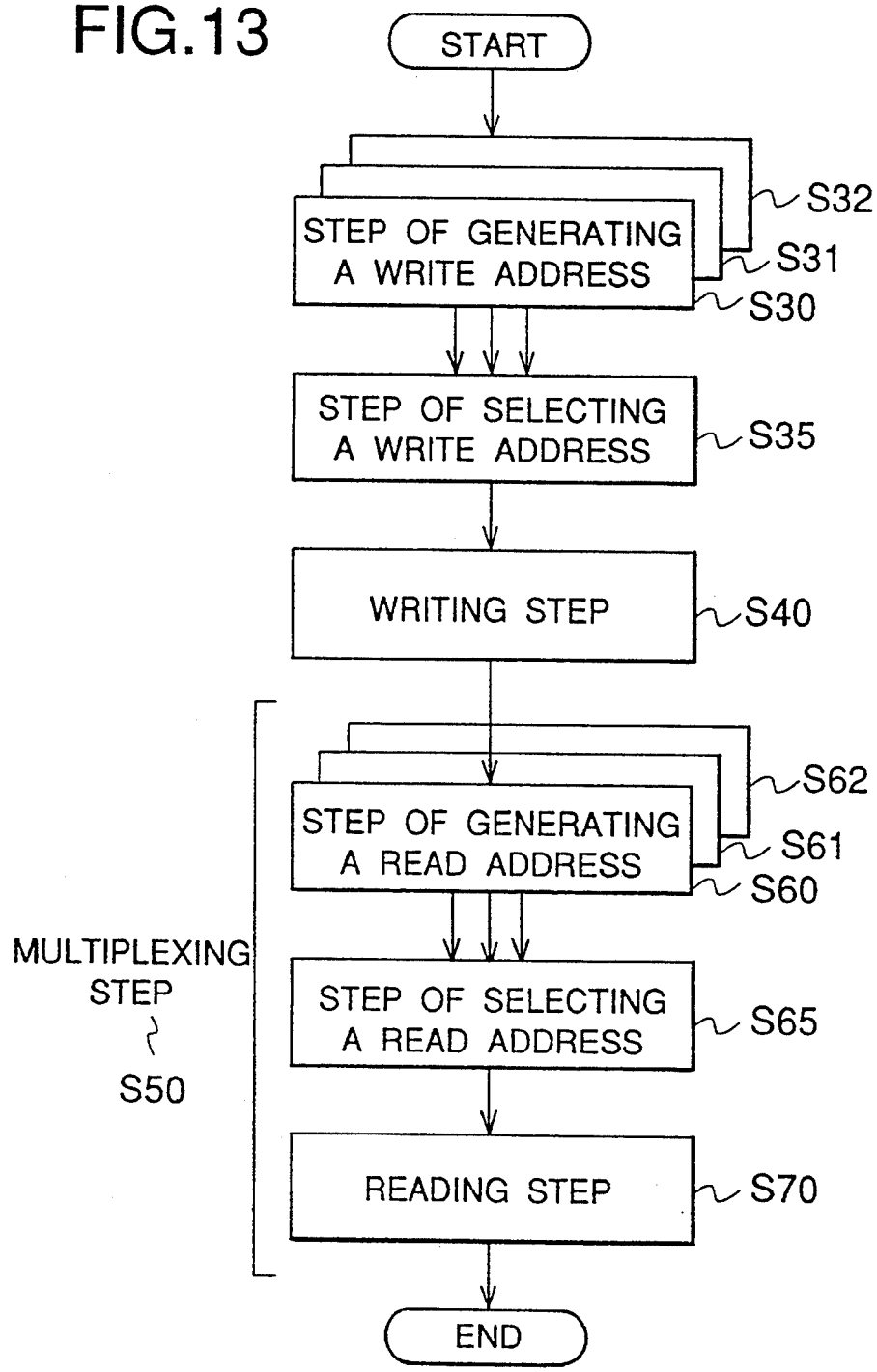
FIG. 13 is a flow chart of a frame phase synchronization method of the present invention.

The frame phase synchronization method in the embodiment is presented with FIG. 13.

Steps S30, S31, S32 of generating a write address correspond to each subframe phase synchronization means. At steps S30, S31, S32, an address of the buffer memory corresponding to each data of the subframe is generated.

At step S35 of selecting the write address, the address generated in the write address generating step is selected by subframe order.

At a writing step S40, data of each subframe is written into the buffer memory, by the address selected in the write address selecting step.

Steps S60, S61, S62 of generating the read address correspond to each subframe phase synchronization means. At steps S60, S61, S62, an address of the buffer memory corresponding to the data of each subframe of the synchronized frame is generated.

At a read address selecting step S65, the address generated by the write address generating means is selected by subframe order.

At a reading step S70, the data of each subframe is read out from the buffer, by the address selected in the read address selecting step.

A multiplexing step S50 is composed of the steps from S60 to S70. The data of the subframe written in the buffer memory is read out and the multiplexed data being synchronized with the standard clock signal is produced in the multiplexing step S50.

A feature of the flow chart shown in FIG. 13 is there being the selecting the write address step S35 and the selecting the read address step S65. Since the write address and the read address is selected in turn by the above two steps, there is no conventional demultiplexing step nor multiplexing step. Namely, it is a major feature that the data is demultiplexed or multiplexed by selecting the write address and the read address by time divisions.

As described above, the apparatus of this embodiment reads and writes data into the buffer memory by selecting an address in turn. The address which reads and writes each data of each subframe is generated by each subframe phase synchronization means. Accordingly any particular MUX and DMUX is not necessary.

The phase synchronization apparatus of TDM frames of this embodiment generates the position signal for the input subframe address, the position signal for the standard subframe address, the write address selection signal and the read address selection signal. The above signals are generated from the input clock signal, the standard clock signal, the input frame phase signal and the standard frame phase signal. The synchronization apparatus also generates the write/read control signal from the input frame signal.

Depending upon the position signal for the input subframe address, the position signal for the standard subframe address and the write/read control signal, the apparatus controls the write address and the read address to be corresponding to the data amount M when $m=1$ or $1/m$ of M when $m>=2$ from the input frame signal at the subframe phase synchronization means. The synchronization apparatus also controls the read address to synchronize the input relative phase of the first to mth input subframe signal with the standard relative phase and outputs the write address and the read address.

The write/read control signal selects the write address selection signal and the read address selection signal. The write address selection signal and the read address selection signal select the write address and the read address in turn. Depending upon the write address and the read address, the buffer memory writes the first to mth input subframe signal effectively demultiplexing from the input frame signal and reads the first to mth synchronized subframe signal effectively multiplexing and outputs it as the synchronized frame signal. However, no demultiplexer or multiplexer are used.

Embodiment 3

Figure 14:
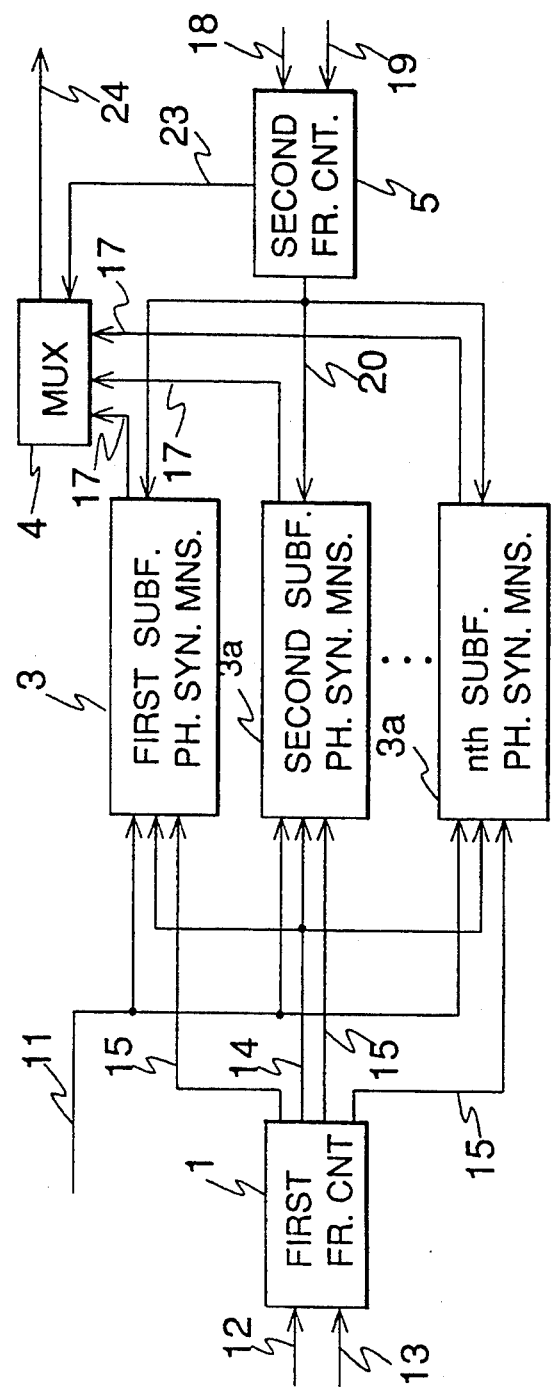
FIG. 14 is a schematic block diagram showing another example of the present invention.

In the Embodiment 1, the case of the multiplexing number being 1 and m have been explained. Besides, an apparatus only corresponding to the case of the multiplexing number being only n, as shown in FIG. 14, is acceptable. In FIG. 14, there is no subframe type detector 2 shown in FIG. 1. The reason for this is that the multiplexing number of the input frame signal 11 being n is apparent, so that it is not necessary to detect subframe type. In the case of the multiplexing number being only n, the first to nth subframe phase synchronization means is always used. The first to nth phase synchronization means is composed similarly as the above one. However, as stated above, the first subframe phase synchronization means does not output the write address 21 and the read address 22 to the other subframe phase synchronization means 3a. As other configurations and operations in FIG. 14 are the same as those of FIG. 1, no further explanation is described here. Even when the input frame signal is input in the case of the multiplexing number being n as shown in FIG. 14, it is also possible to demultiplex the subframe signal from the input frame signal by outputting the write address enabling signal 15 from the first frame counter 1 to each subframe phase synchronization means without using the DMUX.

Embodiment 4

Figure 15:
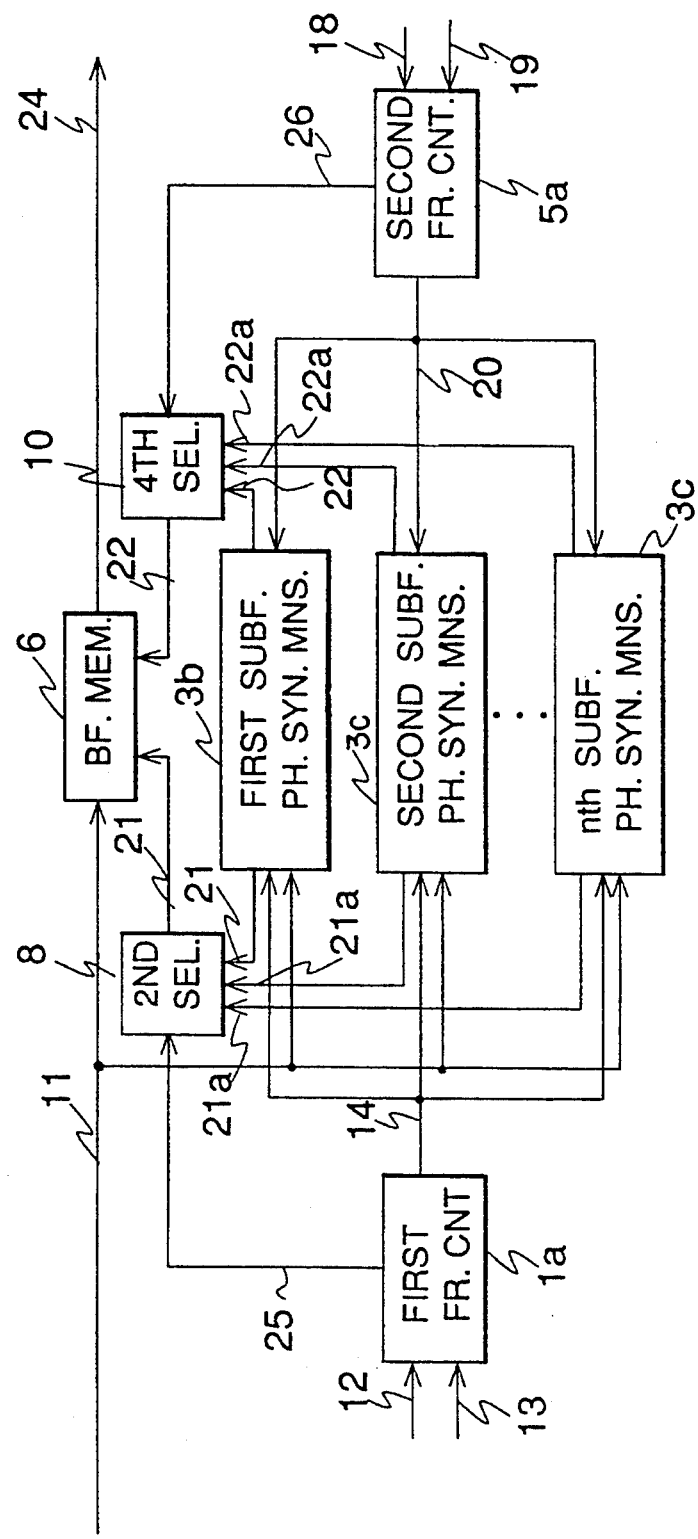
FIG. 15 is a schematic block diagram showing another example of the present invention.

In the Embodiment 2, the case of the multiplexing number of the input frame signal being 1 and m has been explained. As shown in FIG. 15, it is also possible to compose the apparatus corresponding only to the case of the multiplexing number of the input frame signal being n. In FIG. 15, there is no subframe type detector 2, the first selector 7, the third selector 9 shown in FIG. 7. Accordingly, depending upon the write address selection signal from the first frame counter, the second selector selects the write address output from the first to nth subframe phase synchronization means in turn and outputs it to the buffer memory. Similarly, depending upon the read address selection signal from the second frame counter 5a, the fourth selector 10 selects the read address output from the first to nth subframe phase synchronization means and outputs it to the buffer memory. As stated above, it is possible to demultiplex the subframe signal from the input frame signal and multiplex the demultiplexed data and output it by having the configuration shown in FIG. 15.

Embodiment 5

It is possible to process the cases of the multiplexing number being one and three as stated above. However, the multiplexing number can be another except one and three.

The case of the multiplexing number being one and three and there being three subframe phase synchronization means is explained above. Besides, the multiplexing number can be two when there are three subframe phase synchronization means. In this case, the third subframe phase synchronization means is not used. The size of the buffer memory of the first subframe phase synchronization means and the second subframe phase synchronization means should be more than ½ of the data amount M. Thus the multiplexing number is not necessary to be coincident with the number of the subframe phase synchronization means. However, the multiplexing number (m) of the input frame signal should be the same or less than the number (n) of the subframe phase synchronization means. (n>=m)

Relations among the multiplexing number and the number of the subframe phase synchronization means and the size of the buffer memory is presented with FIGS. 16, 17, 18 as follows.

FIG. 16 shows a relation between the number of subframe phase synchronization means and the size of buffer memory in each subframe phase synchronization means in the case of the number of subframe phase synchronization means being 3 and the multiplexing number being 1 or 3. When the multiplexing number is 1, three of the subframe phase synchronization means are used and the size of the buffer memory is at least M/3. When the multiplexing number is 3, three of the subframe phase synchronization means are also used and the size of the buffer memory needs M/3. This case is the same as the one explained in Embodiment 1.

FIG. 17 shows the case of the multiplexing number being 1 or 2 or 3 and the number of subframe phase synchronization means being three. When the multiplexing number is 2, two of the subframe phase synchronization means are used.

Since there being two subframe signals in the input frame signal in this case, the size of the buffer memory in each subframe phase synchronization means is at least M/2.

FIG. 18 shows a relation between the number of the subframe phase synchronization means and the size of the buffer memory in the case of the multiplexing number being at most 4 and the number of the subframe phase synchronization means being four. When the multiplexing number is 1, four of the subframe phase synchronization means are used. When the multiplexing number is 2 or 3 or 4, the number of the phase synchronization means is two or three or four corresponding to the multiplexing number. As the size of the buffer memory is the largest in the case of the multiplexing number being 2, the size of the buffer memory of the subframe phase synchronization means is at least M/2.

Embodiment 6

The phase synchronization apparatus of TDM frames stated above can be integrated in a large scale integrated circuit on a semiconductor substrate. A plurality of phase synchronization apparatus of TDM frames also can be integrated and set up on one semiconductor substrate.

Embodiment 7

The case of STM-1 type frames has been used as an example in the above embodiments. Other frame types, besides STM-1 can be also used.

What is claimed is:

1. A frame phase synchronization apparatus which inputs an input frame signal having at least one multiplexed subframe, each multiplexed subframe including a plurality of data, inputs an input clock signal, the input frame signal being synchronized with the input clock signal, and outputs a synchronized frame signal being synchronized with a standard clock signal, the frame phase synchronization apparatus comprising:

(a) a frame counter, for inputting the input clock signal, and for outputting a write permission signal corresponding to each data of the at least one multiplexed subframe;

(b) a plurality of subframe phase synchronization means, each of which corresponding to each of the multiplexed subframes and having a buffer memory, the plurality of subframe phase synchronization means for inputting the input frame signal, demultiplexing the data of the at least one multiplexed subframe from the input frame signal by storing the data into the buffer memories depending upon the write permission signals from the frame counter, and outputting the data stored in the buffer memories in synchronization with the standard clock signal; and (c) multiplexing means for receiving and multiplexing the data from the subframe phase synchronization means and producing the synchronized frame signal.

2. The frame phase synchronization apparatus of claim 1, wherein the frame counter includes means for generating each write permission signal synchronous with each data of each multiplexed subframe for each of the subframe phase synchronization means.

3. The frame phase synchronization apparatus of claim 1, wherein each subframe phase synchronization means includes:

phase detecting means for detecting a phase of the multiplexed subframe; and address generating means for generating a write address of the buffer memory based on the phase detected by the phase detecting means.

4. The frame phase synchronization apparatus of claim 3, further comprising subframe type detector means for detecting a subframe type of the at least one multiplexed subframe based on the number of multiplexed subframes in the input frame signal; and wherein each subframe phase synchronization means further includes means for operating based on the subframe type detected by the subframe type detector means.

5. The frame phase synchronization apparatus of claim 4, wherein the frame counter further includes means for generating each write permission signal for making each data of each multiplexed subframe correspond to each subframe phase synchronization means in case of the subframe type indicating that there is one multiplexed subframe in the input frame signal; and wherein the plurality of subframe phase synchronization means further includes means for separating the data of the multiplexed subframes and storing the separated data in the buffer memories based on the write permission signals generated by the frame counter.

6. The frame phase synchronization apparatus of claim 5, wherein the plurality of subframe phase synchronization means includes a first subframe phase synchronization means and other subframe phase synchronization means, the first subframe phase synchronization means for making the address generating means generate read and write addresses for reading and writing the data of the at least one multiplexed subframe in each of the buffer memories and supplying the read and write addresses to the buffer memories in the other subframe phase synchronization means.

7. The frame phase synchronization apparatus of claim 6, wherein each of the other subframe phase synchronization means includes:

means for reading and writing the data in the buffer memory based on the read and write addresses supplied by the first subframe phase synchronization means in the case of the subframe type indicating that there is one multiplexed subframe in the input frame signal; and means for making the address generation means generate read and write addresses and reading and writing the data in the buffer memory based on the generated read and write addresses in the case of the subframe type indicating that there are more than one multiplexed subframe in the input frame signal.

8. An apparatus for the phase synchonization of TDM frames which inputs an input frame phase signal, a standard frame phase signal, and an input frame signal having at least one multiplexed subframe, each multiplexed subframe including a plurality of data and the input frame signal being synchronized with an input clock signal, and outputs a standard frame signal synchronous with a standard clock signal, and has a first subframe phase synchronization means and second to nth subframe phase synchronization means, each of which includes a buffer memory, n being an integer greater than two, wherein, each of the TDM frames has a data amount M in the case of there being only one multiplexed subframe in the input frame signal, M being a positive integer, each of the TDM frames has first to mth subframe signals in the case of there being a plurality of multiplexed subframes in the input frame signal, m being a positive integer representing the number of multiplexed subframes included in the input frame signal, input subframe addresses are stored in an overhead of the input frame signal and each of the input subframe addresses indicates a relative phase of each of input subframes with an input frame phase, and standard subframe addresses are stored in an overhead of the standard frame signal and each of the standard subframe addresses indicates a relative phase of each of standard subframes with a standard frame phase, the apparatus comprising:

a first frame counter, for generating position signals for the input subframe addresses, each of which is synchronized with the input clock signal based on the input frame phase signal, and for generating write address enabling signals each of which enables writing the data into the buffer memories of the first and the second to nth subframe phase synchronization means;

a second frame counter, for generating position signals for the standard subframe addresses, each of which is synchronized with the standard clock signal based on the standard frame phase signal, and for generating position signals for the standard subframe into the buffer memories of the first and the second to nth subframe phase synchronization means, wherein each of the position signals for the standard subframes indicates each position of the standard subframes multiplexed in the standard frame signal;

a subframe type detector, for identifying a type of multiplexed subframe by a specific pattern of the input subframe addresses from the input frame signal, wherein the type of subframe indicates m, and for generating a write/read control signal corresponding to one of m=1 and m>=2;

wherein the first subframe phase synchronization means is responsive to the position signal for the input subframe address from the first frame counter, the position signal for the standard subframe address from the second frame counter, the write address enabling signal from the first frame counter and the write/read control signal from the subframe type detector;

wherein the first subframe phase synchronization means includes means for generating a write address and a read address corresponding to one of 1/n and 1/m of the data amount M to control writing and reading for the buffers, means for selecting 1/n signal of the input frame signal from the input frame signal when m=1, and selecting the first input subframe signal when m>=2, means for writing the data corresponding to the selected signal into the buffer memory, and means for outputting the synchronized signal as a first synchronized subframe signal so that the input relative phase is synchronized with the standard relative phase;

wherein each of the second to nth subframe phase synchronization means is responsive to the position signal for the input subframe address from the first frame counter, the position signal for the standard subframe address from the second frame counter, the write address enabling signal from the first frame counter and the write/read control signal from the subframe type detector;

wherein each of the second to nth subframe phase synchronization means includes means for selecting the write address and the read address generated by the first subframe phase synchronization means when m=1 to control writing and reading for the buffer memories, means for generating the write address and the read address corresponding to 1/m of the data amount M when m>=2 to control writing and reading for the buffer memories, means for selecting 1/n signal of a multiplexed subframe when m=1 and one of the second to mth multiplexed subframes when m>=2 from the input frame signal, means for writing the data corresponding to the selected signal into the buffer memory, and means for outputting the synchronized signal as a second to mth synchronized subframe signal so that the input relative phase is synchronized with the standard relative phase; and a multiplexer, responsive to the position signal for the standard subframe from the second frame counter, for multiplexing the first to mth synchronized subframe signals from the first subframe phase synchronization means and the second to nth subframe phase synchronization means, and for outputting the multiplexed signal as the standard frame signal.

9. A frame phase synchronization apparatus which inputs an input frame signal having at least one multiplexed subframe, each multiplexed subframe including a plurality of data and the input frame signal being synchronized with an input clock signal, and outputs a synchronized frame signal being synchronized with a standard clock signal, the frame phase synchronization apparatus comprising:

(a) a plurality of subframe phase synchronization means, each of which corresponds to each of the multiplexed subframes, for generating and outputting a write address corresponding to each data of each multiplexed subframe;

(b) address selecting means for selecting an output from the plurality of subframe phase synchronization means;

(c) a buffer memory for inputting the input frame signal, and for storing the data of the at least one multiplexed subframe depending upon the address selected by the address selecting means; and (d) multiplexing means for reading and multiplexing the data out of the buffer memory, and producing the synchronized frame signal.

10. A frame phase synchronization apparatus which inputs an input frame signal having at least one multiplexed subframe, each multiplexed subframe including a plurality of data and the input frame signal being synchronized with an input clock signal, and outputs a synchronized frame signal being synchronized with a standard clock signal, the frame phase synchronization apparatus comprising:

(a) demultiplexing means for inputting the input frame signal and for demultiplexing the at least one multiplexed subframe;

(b) a plurality of subframe phase synchronization means corresponding to each of the multiplexed subframes, for generating and outputting a read address corresponding to each data of each multiplexed subframe;

(c) address selecting means for selecting an output from the plurality of the subframe phase synchronization means; and (d) a buffer memory for storing the data demultiplexed by the demultiplexing means, and for reading the data out depending upon the address selected by the address selecting means.

11. The frame phase synchronization apparatus of claim 9 or 10, wherein the buffer memory includes a plurality of divided memory areas, and means for storing the data of each multiplexed subframe in each of the divided memory areas; and wherein the subframe phase synchronization means comprises means for generating the addresses corresponding to each of the divided memory areas.

12. The frame phase synchronization apparatus of claim 9 or 10, wherein each multiplexed subframes has a predefined data amount and each of the memory areas has a memory size to store the predefined data amount of the subframe; and wherein the subframe phase synchronization means further includes means for generating the addresses in every memory size.

13. The frame phase synchronization apparatus of claim 9 or 10, further comprising subframe type detector means for detecting a subframe type of the at least one multiplexed subframe in the input frame signal; and wherein, the plurality of subframe phase synchronization means includes a first subframe phase synchronization means and other subframe phase synchronization means, in the case that the subframe type indicates there being one multiplexed subframe in the input frame signal, the first subframe phase synchronization means generates the address of the buffer memory and the address selecting means continuously selects the address generated by the first subframe phase synchronization means, and in the case that the subframe type indicates there are more than one multiplexed subframe in the input frame signal, first and other subframe phase synchronization means generate the addresses of the buffer memories and the address selecting means cyclically selects the addresses generated by the first and other subframe phase synchronization means.

14. The frame phase synchronization apparatus of claim 13, further comprising:

operation selecting means for selecting one of two operations of the address selecting means, one for the continuous selection of the address generated by the first subframe phase synchronization means, the other for the cyclic selection of the addresses generated by the plurality of subframe phase synchronization means.

15. An apparatus for the phase synchronization of TDM frames which inputs an input frame phase signal, a standard frame phase signal, and an input frame signal having at least one multiplexed subframe, each multiplexed subframe including a plurality of data and the input frame signal being synchronized with an input clock signal, and outputs a standard frame signal being synchronized with a standard clock signal, and has a first subframe phase synchronization means and second to nth subframe phase synchronization means, each of which includes a buffer memory, n being an integer greater than two, wherein, each of the TDM frames has a data amount M in the case of there being only one multiplexed subframe in the input frame signal, M being a positive integer, each of the TDM frames has first to mth subframe signals in the case of there being a plurality of multiplexed subframes in the input frame signal, m being a positive integer representing the number of multiplexed subframes included in the input frame signal, input subframe addresses are stored in an overhead of the input frame signal and each of the input subframe addresses indicates a relative phase of each of input subframes with an input frame phase, and standard subframe addresses are stored in an overhead of the standard frame signal and each of the standard subframe addresses indicates a relative phase of each of standard subframes with a standard frame phase, the apparatus comprising:

a first frame counter, for generating the position signals for the input subframe addresses, each of which is synchronized with the input clock signal based on the input frame phase signal, and for generating a write address selection signal which is synchronized with the input subframe phase;

a second frame counter, for generating the position signals for the standard subframe addresses each of which is synchronized with the standard clock signal based on the standard frame phase signal, and for generating a read address selection signal which is synchronized with the standard subframe phase;

a subframe type detector, for identifying a type of multiplexed subframe by a specific pattern of the input subframe addresses from the input frame signal, wherein the type of subframe indicates m, and for generating a write/read control signal corresponding to one of $m=1$ and $m>=2$;

wherein the first subframe phase synchronization means is responsive to the position signal for the input subframe address from the first frame counter, the position signal for the standard subframe address from the second frame counter and the write/read control signal from the subframe type detector, and the first subframe phase synchronization means includes means for generating the write address and the read address from the input frame signal to correspond with the data amount M when $m=1$ and $1/m$ of M when $m>=2$, means for generating the read address for the data corresponding to the data amount M when $m=1$, or corresponding to a first multiplexed subframe when $m>=2$, to synchronize the input relative phase with the standard relative phase, and wherein each of the second to nth subframe phase synchronization means is responsive to the input frame signal, the position signal for the input subframe address from the first frame counter and the position signal for the standard subframe address from the second frame counter, and each of the second to nth subframe phase synchronization means includes means for generating the write address and the read address to correspond with $1/m$ of the data amount M, and means for generating the read address for the data corresponding to the second to mth multiplexed subframe when $m>=2$, to synchronize the input relative phase with the standard relative phase;

a first selector for selecting the write address selection signal from the first frame counter depending upon the write/read control signal from the subframe type detector;

a second selector for selecting the write address from the first and second to mth subframe phase synchronization means in order depending upon the write address selection signal from the first selector;

a third selector for selecting the read address selection signal from the second frame counter depending upon the write/read control signal from the subframe type detector;

a fourth selector for selecting the read address from the first and second to mth subframe phase synchronization means in turn depending upon the read address selection signal from the third selector; and wherein the buffer memory comprises means for writing the first to mth multiplexed subframe effectively demultiplexing from the input frame signal depending upon the write address from a second selector, mean for reading the first to mth synchronized subframe signal effectively multiplexing depending upon the read address from a fourth selector, and means for outputting the multiplexed first to mth synchronized subframe signal as a synchronized frame signal.

16. A frame phase synchronization method which inputs an input frame signal having at least one multiplexed subframe, each multiplexed subframe including a plurality of data, inputs an input clock signal, the input frame signal being synchronized with the input clock signal, and outputs a synchronized frame signal being synchronized with a standard clock signal, comprising the steps of:

(a) inputting an input frame signal into each of a plurality of subframe phase synchronization means;

(b) generating a write permission signal corresponding to each data of each multiplexed subframe and giving the write permission signal to each subframe phase synchronization means;

(c) generating an address for writing the data of the input frame signal into a buffer memory synchronous with the input frame signal input by the inputting step, at each subframe phase synchronization means;

(d) writing the data of the input frame signal into the buffer memory at each subframe phase synchronization means synchronous with the write permission signal depending upon the address generated by the address generating step; and (e) reading and multiplexing the data from the buffer memory, and outputting the synchronized frame signal.

17. A frame phase synchronization method which inputs an input frame signal having at least one multiplexed subframe, each multiplexed subframe including a plurality of data, inputs an input clock signal, the input frame signal being synchronized with the input clock signal, and outputs a synchronized frame signal being synchronized with a standard clock signal, comprising the steps of:

(a) generating write addresses of a buffer memory corresponding to each data of each multiplexed subframe;

(b) selecting a write address out of the write addresses generated from the write address generating step in turn;

(c) inputting the input frame signal and writing the data of each multiplexed subframe into the buffer memory according to the address selected by the write address selecting step; and (d) reading out and multiplexing data written in the buffer memory by the writing step, synchronous with the standard clock signal.

18. The frame phase synchronization method of claim 17, wherein the multiplexing step comprises the steps of (a) generating read addresses of the buffer memory to correspond with each data of each multiplexed subframe of the synchronized frame signal;

(b) selecting a read address out of the read addresses generated by the read address generating step in turn; and (c) reading out the data of each multiplexed subframe from the buffer memory by the read address selected by the read address selecting step.

19. A frame phase synchronization apparatus which inputs an input frame signal having multiplexing data of a plurality of subframes and being synchronized with an input clock signal, and outputs a synchronized frame signal being synchronized with a standard clock signal, comprising:

(a) a frame counter for outputting a write permission signal corresponding to each data of the multiplexed subframes, wherein the frame counter comprises means for generating the write permission signal synchronous with each data of each subframe for each of the subframe phase synchronization means;

(b) subframe type detector means for detecting a subframe type of the subframe based on the number of the subframes multiplexed in the input frame signal;

(c) a plurality of subframe phase synchronization means, each of which corresponding to each of the subframes and having a buffer memory, for inputting the input frame signal, for demultiplexing data of subframes from the input frame signal, for storing the demultiplexed data into the buffer memory depending upon the write permission signal from the frame counter, and for outputting data stored in the buffer memory synchronous with the standard clock signal, wherein the subframe phase synchronization means includes phase detecting means for detecting a phase of the corresponding subframe, address generating means for generating a write address of the buffer memory based on the phase detected by the phase detecting means, and means for operating based on the subframe type detected by the subframe type detector means; and (d) multiplexing means for multiplexing data output from the subframe phase synchronization means and producing the synchronized frame signal.

20. The frame phase synchronization apparatus of claim 19, wherein, the frame counter further comprises means for generating the write permission signal for making each data of the subframe correspond to each subframe type indicating that there is one subframe multiplexed in the input frame signal, and the subframe phase synchronization means further comprises means for separating multiplexed data of the subframes and storing the separated data in the buffer memory based on the write permission signal generated by the frame counter.

21. The frame phase synchronization apparatus of claim 20, wherein the plurality of subframe phase synchronization means further comprise a first subframe phase synchronization means and other subframe phase synchronization means, the first subframe phase synchronization means for making the address generating means generate read and write addresses for reading and writing data of the subframes in each of the buffer memories and for supplying the read and write addresses to the buffer memories in the other subframe phase synchronization means.

22. The frame phase synchronization apparatus of claim 21, wherein each of the other subframe phase synchronization means comprises:
    means for reading and writing data in the buffer memory based on the read and write addresses supplied by the first subframe phase synchronization means in the case of the subframe type indicating that there is one subframe in the input frame signal; and
    means for making the address generation means generate read and write addresses and reading and writing data in the buffer memory based on the generated read and write addresses in the case of the subframe type indicating that there are more than one subframes multiplexed in the input frame signal.

23. A frame phase synchronization apparatus which inputs an input frame signal having multiplexing data of a plurality of subframes and being synchronized with an input clock signal, and which outputs a synchronized frame signal being synchronized with a standard clock signal, comprising:
    (a) subframe type detector means for detecting a subframe type of the subframe multiplexed in the input frame signal;
    (b) a plurality of subframe phase synchronization means, each of which corresponding to each of the subframes, for generating a write address corresponding to each data of each subframe,
    wherein the plurality of subframe phase synchronization means includes a first subframe phase synchronization means and other subframe phase synchronization means;
    (c) address selecting means for selecting an address out of the write addresses generated by the subframe phase synchronization means;
    (d) a buffer memory for inputting the input frame signal, and for storing data of the multiplexed subframes depending upon the address selected by the address selecting means; and
    (e) multiplexing means for reading and multiplexing data out of the buffer memory, and for producing the synchronized frame signal,
    wherein,
    in the case that the subframe type indicates there being one subframe in the input frame signal, the first subframe phase synchronization means generates the address of the buffer memory and the address selecting means continuously selects the address generated by the first subframe phase synchronization means, and
    in the case that the subframe type indicates there are more than one subframes multiplexed in the input frame signal, the first and the other subframe phase synchronization means generate the addresses of the buffer memory and the address selecting means cyclically selects the addresses generated by the first and other subframe phase synchronization means.

24. The frame phase synchronization apparatus of claim 23, further comprising:
    operation selecting means for selecting one of two operations of the address selecting means, one for the continuous selection of the address generated by the first subframe phase synchronization means, the other for the cyclic selection of the addresses generated by the plurality of subframe phase synchronization means.

25. A frame phase synchronization apparatus which inputs an input frame signal multiplexing data of a plurality of subframes and being synchronized with an input clock signal, and which outputs a synchronized frame signal being synchronized with a standard clock signal, comprising:
    (a) demultiplexing means for inputting the input frame signal and for demultiplexing the multiplexed subframes;
    (b) a plurality of subframe phase synchronization means corresponding to each of the subframes, for generating a read address corresponding to each data of each subframe,
    wherein the plurality of subframe phase synchronization means includes a first subframe phase synchronization means and other subframe phase synchronization means;
    (c) address selecting means for selecting an address out of the read addresses generated by the subframe phase synchronization means; and
    (d) a buffer memory for storing data demultiplexed by the demultiplexing means, and for reading the data out depending upon the address selected by the address selecting means,
    wherein,
    in the case that the subframe type indicates there being one subframe in the input frame signal, the first subframe phase synchronization means generates the address of the buffer memory and the address selecting means continuously selects the address generated by the first subframe phase synchronization means, and
    in the case that the subframe type indicates there are more than one subframes multiplexed in the input frame signal, the first and the other subframe phase synchronization means generate the addresses of the buffer memory and the address selecting means cyclically selects the addresses generated by the first and other subframe phase synchronization means.

26. The frame phase synchronization apparatus of claim 25, further comprising:
    operation selecting means for selecting one of two operations of the address selecting means, one for the continuous selection of the address generated by the first subframe phase synchronization means, the other for the cyclic selection of the addresses generated by the plurality of subframe phase synchronization means.

27. A frame phase synchronization apparatus which inputs an input frame signal having at least one multiplexed subframe, each multiplexed subframe including a plurality of data, and
    inputs an input clock signal, the input frame signal being synchronized with the input clock signal,
    the frame phase synchronization apparatus comprising:
    (a) a frame counter,
        for inputting the input clock signal, and
        for outputting a write permission signal corresponding to each data of the at least one multiplexed subframe; and
    (b) a plurality of subframe phase synchronization means, each of which corresponding to each of the multiplexed subframes and having a buffer memory, the plurality of subframe phase synchronization means for inputting the input frame signal, demultiplexing the data of the at least one multiplexed subframe from the input frame signal by storing the data into the buffer memories depending upon the write permission signals from the frame counter, and outputting in synchronization with the standard clock signal based on the data stored in the buffer memories.

28. A frame phase synchronization apparatus which inputs an input frame signal having at least one multiplexed subframe, each multiplexed subframe including a plurality of data and the input frame signal being synchronized with an input clock signal, the frame phase synchronization apparatus comprising:
(a) a plurality of subframe phase synchronization means, each of which corresponds to each of the multiplexed subframes, for generating and outputting a write address corresponding to each data of each multiplexed subframe;
(b) address selecting means for selecting an output from the plurality of subframe phase synchronization means; and
(c) a buffer memory for inputting the input frame signal, for storing the data of the at least one multiplexed subframe depending upon the address selected by the address selecting means, and for producing a signal synchronized with a standard clock signal.

29. A frame phase synchronization apparatus which inputs demultiplexed signals having at least one demultiplexed subframe, each demultiplexed subframe including a plurality of data and the input demultiplexed signals being synchronized with an input clock signal, the frame phase synchronization apparatus comprising:
(a) a plurality of subframe phase synchronization means corresponding to each of the demultiplexed subframes, for generating and outputting a read address corresponding to each data of each demultiplexed subframe;
(b) address selecting means for selecting an output from the plurality of the subframe phase synchronization means; and
(c) a buffer memory for storing the demultiplexed data, and for reading the data out depending upon the address selected by the address selecting means.

30. A frame phase synchronization method which inputs an input frame signal having at least one multiplexed subframe, each multiplexed subframe including a plurality of data, and inputs an input clock signal, the input frame signal being synchronized with the input clock signal, and comprising the steps of:
(a) inputting an input frame signal into each of a plurality of subframe phase synchronization means;
(b) generating a write permission signal corresponding to each data of each multiplexed subframe and giving the write permission signal to each subframe phase synchronization means;
(c) generating an address for writing the data of the input frame signal into a buffer memory synchronous with the input frame signal input by the inputting step, at each subframe phase synchronization means;
(d) writing the data of the input frame signal into the buffer memory at each subframe phase synchronization means synchronous with the write permission signal depending upon the address generated by the address generating step; and
(e) reading the data from the buffer memory, and outputting a synchronized signal.

31. A frame phase synchronization method which inputs an input frame signal having at least one multiplexed subframe, each multiplexed subframe including a plurality of data, inputs an input clock signal, the input frame signal being synchronized with the input clock signal, comprising the steps of:
(a) generating write addresses of a buffer memory corresponding to each data of each multiplexed subframe;
(b) selecting a write address out of the write addresses generated from the write address generating step in turn;
(c) inputting the input frame signal and writing the data of each multiplexed subframe into the buffer memory according to the address selected by the write address selecting step; and
(d) reading out data written in the buffer memory by the writing step, synchronous with the standard clock signal.

32. A frame phase synchronization apparatus comprising:

a frame counter, outputting a plurality of write enable signals corresponding to a plurality of separate data portions of a multiplexed subframe of a frame signal, and a plurality of subframe synchronization members, coupled to the frame counter, receiving the frame signal and the write enable signals, wherein each subframe synchronization member stores a corresponding data portion of the multiplexed subframe when enabled by a corresponding write enable signal.

* * * * *